(12) United States Patent
Sakhnini et al.

(10) Patent No.: US 12,562,879 B2
(45) Date of Patent: Feb. 24, 2026

(54) DYNAMIC INDICATIONS OF MODIFICATIONS TO A PERIODIC RESOURCE GRANT

(71) Applicant: QUALCOMM Incorporated, San Diego, CA (US)

(72) Inventors: Iyab Issam Sakhnini, San Diego, CA (US); Olufunmilola Omolade Awoniyi-Oteri, San Diego, CA (US); Tao Luo, San Diego, CA (US); Jelena Damnjanovic, Del Mar, CA (US); Peter Gaal, San Diego, CA (US); Wanshi Chen, San Diego, CA (US); Juan Montojo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/188,259

(22) Filed: Mar. 22, 2023

(65) Prior Publication Data

US 2023/0353333 A1 Nov. 2, 2023

Related U.S. Application Data

(60) Provisional application No. 63/363,748, filed on Apr. 28, 2022.

(51) Int. Cl.
 *H04L 5/00* (2006.01)
 *H04W 72/11* (2023.01)

(52) U.S. Cl.
 CPC .......... *H04L 5/0096* (2013.01); *H04L 5/0078* (2013.01); *H04W 72/11* (2023.01)

(58) Field of Classification Search
 CPC ... H04L 5/0096; H04L 5/0078; H04L 1/0003; H04L 1/0009; H04L 1/0025; H04L 1/0031; H04L 1/08; H04L 5/0053; H04L 5/0091; H04W 72/11; H04W 72/23; H04W 72/1268; H04W 72/14
 See application file for complete search history.

(56) References Cited

U.S. PATENT DOCUMENTS

| 2020/0267755 A1* | 8/2020 | Ugurlu | H04W 72/0453 |
|---|---|---|---|
| 2021/0329690 A1 | 10/2021 | Tokgoz et al. | |
| 2022/0039144 A1* | 2/2022 | Alabbasi | H04W 72/23 |
| 2022/0304042 A1* | 9/2022 | Yang | H04L 5/0091 |
| 2023/0397216 A1* | 12/2023 | Kang | H04W 72/1268 |
| 2024/0147496 A1* | 5/2024 | Ganesan | H04W 72/232 |
| 2025/0159691 A1* | 5/2025 | Awad | H04W 72/044 |

OTHER PUBLICATIONS

WO_2022027294_A1 (Year: 2022).*
WO_2022084525_A1 (Year: 2022).*
International Search Report and Written Opinion—PCT/US2023/020057—ISA/EPO—Sep. 7, 2023.

* cited by examiner

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for a periodic resource grant, the configuration indicating a set of parameters for the periodic resource grant. The UE may receive a dynamic indication of a modification to one or more of the set of parameters. The UE may receive one or more communications via the periodic resource grant based at least in part on the modification. Numerous other aspects are described.

30 Claims, 15 Drawing Sheets

700

1010 Receive a configuration for a periodic resource grant, the configuration indicating a set of parameters for the periodic resource grant 1020 Receive a dynamic indication of a modification to one or more of the set of parameters 1030 Receive one or more communications via the periodic resource grant based at least in part on the modification

1000

1110 — Receive a configuration for a periodic resource grant, the configuration indicating a set of parameters for the periodic resource grant 1120 — Transmit a dynamic indication of a modification to one or more of the set of parameters 1130 — Transmit one or more communications via the periodic resource grant based at least in part on the modification

1100

1210 — Transmit a configuration for a periodic resource grant, the configuration indicating a set of parameters for the periodic resource grant 1220 — Transmit a dynamic indication of a modification to one or more of the set of parameters 1230 — Transmit one or more communications via the periodic resource grant based at least in part on the modification

1200

1310 — Transmit a configuration for a periodic resource grant, the configuration indicating a set of parameters for the periodic resource grant 1320 — Receive a dynamic indication of a modification to one or more of the set of parameters 1330 — Receive one or more communications via the periodic resource grant based at least in part on the modification

1300

1500

Reception Component 1502

Communication Manager 1508

Transmission Component 1504

1506

DYNAMIC INDICATIONS OF MODIFICATIONS TO A PERIODIC RESOURCE GRANT

CROSS-REFERENCE TO RELATED APPLICATION

This patent application claims priority to U.S. Provisional Patent Application No. 63/363,748, filed on Apr. 28, 2022, entitled "DYNAMIC INDICATIONS OF MODIFICATIONS TO A PERIODIC RESOURCE GRANT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic indications of modifications to a periodic resource grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration for a periodic resource grant, the configuration indicating a set of parameters for the periodic resource grant. The method may include receiving a dynamic indication of a modification to one or more of the set of parameters. The method may include receiving one or more communications via the periodic resource grant based at least in part on the modification.

Some aspects described herein relate to a method of wireless communication performed by a UE. The method may include receiving a configuration for a periodic resource grant, the configuration indicating a set of parameters for the periodic resource grant. The method may include transmitting a dynamic indication of a modification to one or more of the set of parameters. The method may include transmitting one or more communications via the periodic resource grant based at least in part on the modification.

Some aspects described herein relate to a method of wireless communication performed by a network node. The method may include transmitting a configuration for a periodic resource grant, the configuration indicating a set of parameters for the periodic resource grant. The method may include transmitting a dynamic indication of a modification to one or more of the set of parameters. The method may include transmitting one or more communications via the periodic resource grant based at least in part on the modification.

Some aspects described herein relate to a method of wireless communication performed by a network node. The method may include transmitting a configuration for a periodic resource grant, the configuration indicating a set of parameters for the periodic resource grant. The method may include receiving a dynamic indication of a modification to one or more of the set of parameters. The method may include receiving one or more communications via the periodic resource grant based at least in part on the modification.

Some aspects described herein relate to a UE for wireless communication. The UE may include a memory and one or more processors coupled to the memory. The one or more processors may be configured to receive a configuration for a periodic resource grant, the configuration indicating a set of parameters for the periodic resource grant. The one or more processors may be configured to receive a dynamic indication of a modification to one or more of the set of parameters. The one or more processors may be configured to receive one or more communications via the periodic resource grant based at least in part on the modification.

Some aspects described herein relate to a UE for wireless communication. The UE may include a memory and one or more processors coupled to the memory. The one or more processors may be configured to receive a configuration for a periodic resource grant, the configuration indicating a set of parameters for the periodic resource grant. The one or more processors may be configured to transmit a dynamic indication of a modification to one or more of the set of parameters. The one or more processors may be configured to transmit one or more communications via the periodic resource grant based at least in part on the modification.

Some aspects described herein relate to a network node for wireless communication. The network node may include a memory and one or more processors coupled to the memory. The one or more processors may be configured to transmit a configuration for a periodic resource grant, the configuration indicating a set of parameters for the periodic resource grant. The one or more processors may be configured to transmit a dynamic indication of a modification to one or more of the set of parameters. The one or more processors may be configured to transmit one or more communications via the periodic resource grant based at least in part on the modification.

Some aspects described herein relate to a network node for wireless communication. The network node may include a memory and one or more processors coupled to the memory. The one or more processors may be configured to transmit a configuration for a periodic resource grant, the configuration indicating a set of parameters for the periodic resource grant. The one or more processors may be configured to receive a dynamic indication of a modification to one or more of the set of parameters. The one or more processors may be configured to receive one or more communications via the periodic resource grant based at least in part on the modification.

Some aspects described herein relate to a non-transitory computer-readable medium that stores a set of instructions for wireless communication by a UE. The set of instructions, when executed by one or more processors of the UE, may cause the UE to receive a configuration for a periodic resource grant, the configuration indicating a set of parameters for the periodic resource grant. The set of instructions, when executed by one or more processors of the UE, may cause the UE to receive a dynamic indication of a modification to one or more of the set of parameters. The set of instructions, when executed by one or more processors of the UE, may cause the UE to receive one or more communications via the periodic resource grant based at least in part on the modification.

Some aspects described herein relate to a non-transitory computer-readable medium that stores a set of instructions that, when executed by one or more processors of a UE may cause the UE to receive a configuration for a periodic resource grant, the configuration indicating a set of parameters for the periodic resource grant. The set of instructions, when executed by one or more processors of the UE, may cause the UE to transmit a dynamic indication of a modification to one or more of the set of parameters. The set of instructions, when executed by one or more processors of the UE, may cause the UE to transmit one or more communications via the periodic resource grant based at least in part on the modification.

Some aspects described herein relate to a non-transitory computer-readable medium that stores a set of instructions for wireless communication by a network node. The set of instructions, when executed by one or more processors of the network node, may cause the network node to transmit a configuration for a periodic resource grant, the configuration indicating a set of parameters for the periodic resource grant. The set of instructions, when executed by one or more processors of the network node, may cause the network node to transmit a dynamic indication of a modification to one or more of the set of parameters. The set of instructions, when executed by one or more processors of the network node, may cause the network node to transmit one or more communications via the periodic resource grant based at least in part on the modification.

Some aspects described herein relate to a non-transitory computer-readable medium that stores a set of instructions for wireless communication by a network node. The set of instructions, when executed by one or more processors of the network node, may cause the network node to transmit a configuration for a periodic resource grant, the configuration indicating a set of parameters for the periodic resource grant. The set of instructions, when executed by one or more processors of the network node, may cause the network node to receive a dynamic indication of a modification to one or more of the set of parameters. The set of instructions, when executed by one or more processors of the network node, may cause the network node to receive one or more communications via the periodic resource grant based at least in part on the modification.

Some aspects described herein relate to an apparatus for wireless communication. The apparatus may include means for receiving a configuration for a periodic resource grant, the configuration indicating a set of parameters for the periodic resource grant. The apparatus may include means for receiving a dynamic indication of a modification to one or more of the set of parameters. The apparatus may include means for receiving one or more communications via the periodic resource grant based at least in part on the modification.

Some aspects described herein relate to an apparatus for wireless communication. The apparatus may include means for receiving a configuration for a periodic resource grant, the configuration indicating a set of parameters for the periodic resource grant. The apparatus may include means for transmitting a dynamic indication of a modification to one or more of the set of parameters. The apparatus may include means for transmitting one or more communications via the periodic resource grant based at least in part on the modification.

Some aspects described herein relate to an apparatus for wireless communication. The apparatus may include means for transmitting a configuration for a periodic resource grant, the configuration indicating a set of parameters for the periodic resource grant. The apparatus may include means for transmitting a dynamic indication of a modification to one or more of the set of parameters. The apparatus may include means for transmitting one or more communications via the periodic resource grant based at least in part on the modification.

Some aspects described herein relate to an apparatus for wireless communication. The apparatus may include means for transmitting a configuration for a periodic resource grant, the configuration indicating a set of parameters for the periodic resource grant. The apparatus may include means for receiving a dynamic indication of a modification to one or more of the set of parameters. The apparatus may include means for receiving one or more communications via the periodic resource grant based at least in part on the modification.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

6

FIGS. 10-13 are diagrams illustrating example processes associated with dynamic indications of modifications to a periodic resource grant, in accordance with the present disclosure.

Figure 14:
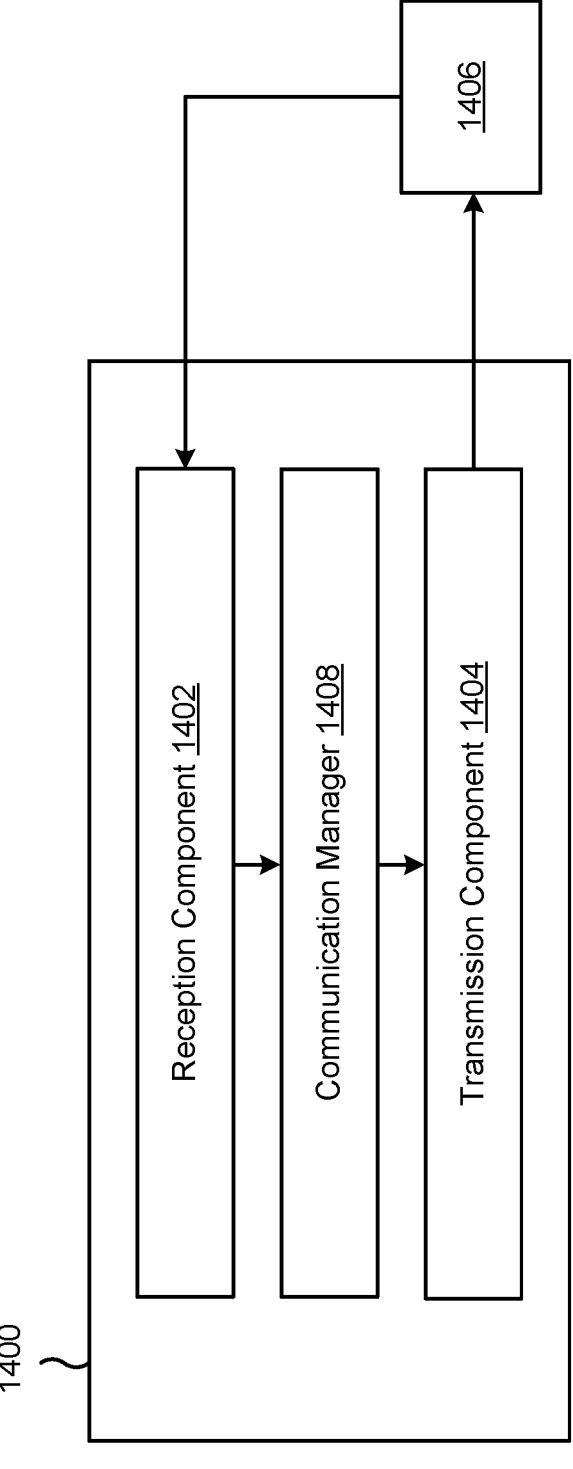
Figure 15:
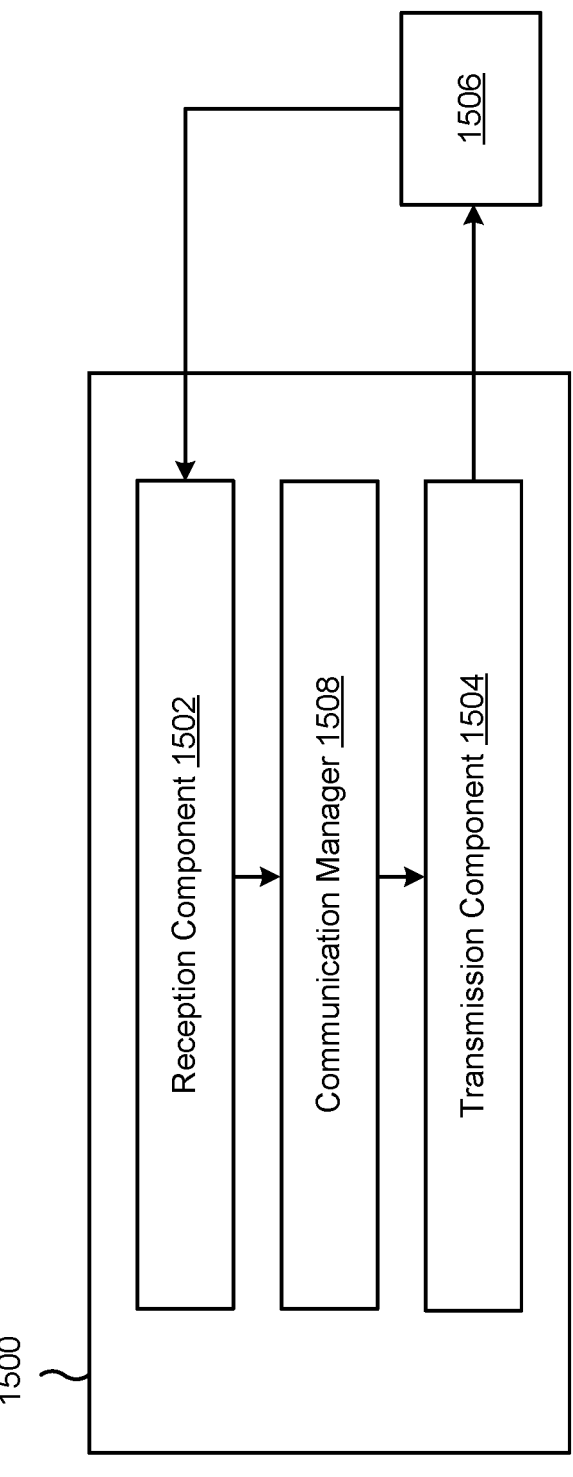

FIGS. 14 and 15 are diagrams of example apparatuses for wireless communication, in accordance with the present disclosure.

DETAILED DESCRIPTION

For data streams, such as XR traffic, packet bursts may be periodic with some jitter in arrival times. Packet sizes and numbers of packets for bursts may be variable. A dynamic grant may be used to handle the data streams, but variability in the packet bursts may consume computing, power, network, and/or communication resources for additional signaling (e.g., via a physical downlink control channel (physical downlink control channel (PDCCH))) and additional decoding (e.g., PDCCH decoding).

A periodic resource grant (e.g., a configured grant (CG) or semi-persistent-scheduling (SPS), among other examples) may be used to handle the data streams. However, variability in numbers of packets, sizes of packets, and non-integer cycles may waste resources and/or cause delay. For example, the network may not know traffic details, so the network may over-allocate resources or under-allocate resources. Over-allocating resources may unnecessarily consume network resources that are not used for transmissions. Under-allocating resources may cause delays, which may disrupt a data flow and/or cause the user equipment (UE) and/or a network node to detect and correct errors caused by delay (e.g., expiration of a packet delay budget (PDB) that causes the network node to drop packets or reception of the data packets at the UE after a deadline for rendering, among other examples).

In some aspects described herein, a UE may be configured with a periodic resource grant (e.g., an SPS or a CG, among other examples). The UE and/or the network node may dynamically modify one or more parameters of the periodic resource grant (e.g., based at least in part on a flow associated with the periodic resource grant). For example, the UE and/or the network node may indicate a modification to the periodic resource grant via a wake-up signal (WUS), parameters of the WUS (e.g., a sequence and/or a channel of the WUS, among other examples), DMRS, parameters of the DMRSs (e.g., a pattern and/or a sequence, among other examples), downlink control information (DCI), a resource modification indication (RMI), a medium access control (MAC) control element (CE), an indication piggy-backed on a dynamic grant or a periodic resource grant (e.g., SPS or CG), an indication piggy-backed on a communication scheduled via a dynamic grant or a periodic resource grant, an indication within an uplink control channel (e.g., uplink control information (UCI)), and/or an indication within a scheduling request (scheduling request), among other examples.

Based at least in part on the UE receiving or transmitting a dynamic indication of a modification to one or more of a set of parameters associated with a periodic resource grant, the periodic resource grant may be adaptable to traffic parameters and/or characteristics of a stream with jitter and/or with a non-integer period (e.g., extended reality (XR) data). In this way, the network node and the UE may conserve network resources that may have otherwise been consumed by over-allocating resources to the periodic resource grant. Additionally, or alternatively, the network node and the UE may avoid under-allocating resources to the periodic resource grant. In this way, the network node and the UE may conserve communication, network, power, and computing resources that may have otherwise been consumed for detecting and correcting errors caused by delay from under-allocating resources to the periodic resource grant.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
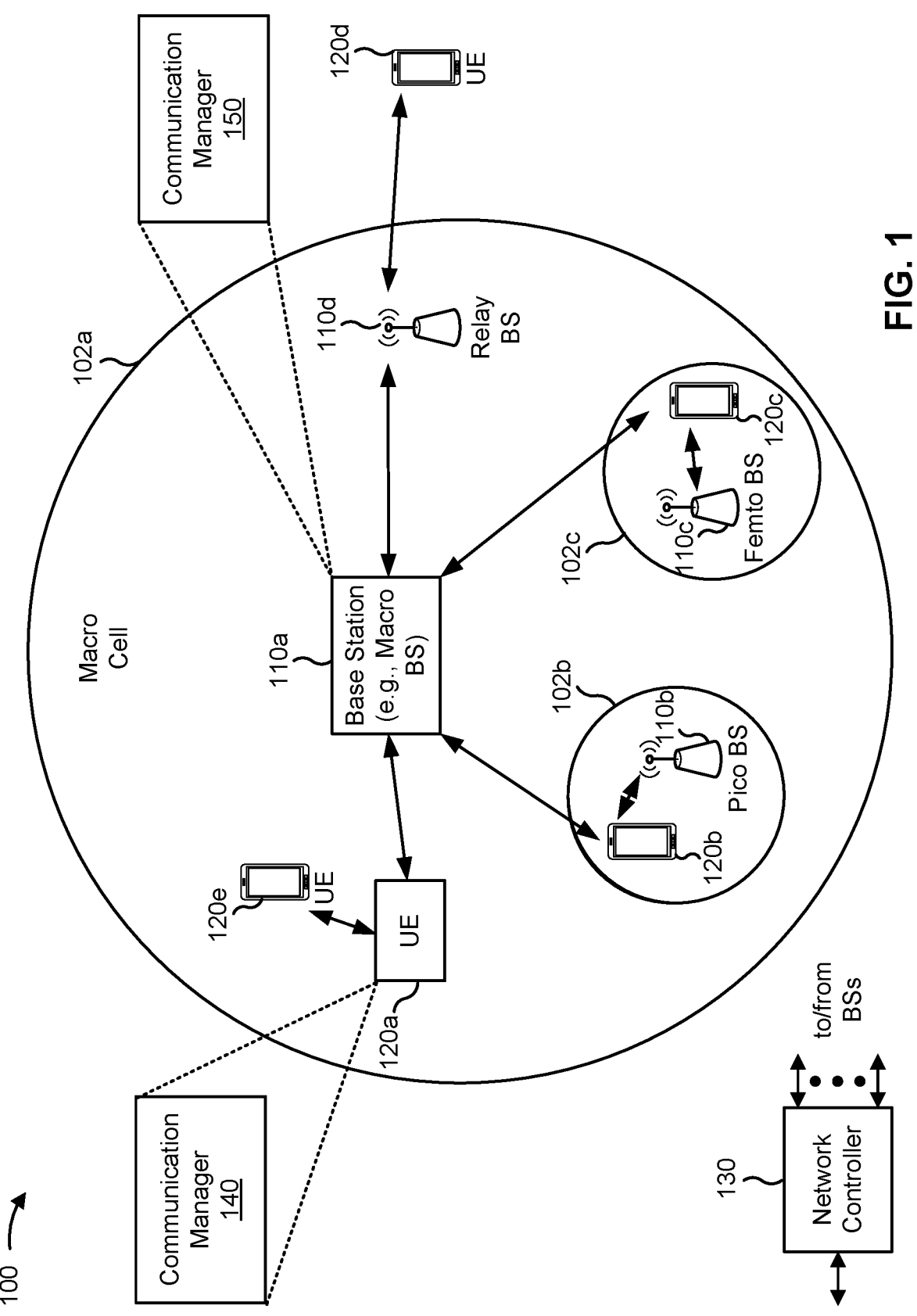
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for a periodic resource grant, the configuration indicating a set of parameters for the periodic resource grant; receive a dynamic indication of a modification to one or more of the set of parameters; and receive one or more communications via the periodic resource grant based at least in part on the modification. Additionally, or alternatively, as described in more detail elsewhere herein, the communication manager 140 may receive a configuration for a periodic resource grant, the configuration indicating a set of parameters for the periodic resource grant; transmit a dynamic indication of a modification to one or more of the set of parameters; and transmit one or more communications via the periodic resource grant based at least in part on the modification. Additionally, or alternatively, the communication manager 140 may perform one or more other operations described herein.

In some aspects, a network node (e.g., a base station 110 or a component of a base station) may include a communication manager 150. As described in more detail elsewhere herein, the communication manager 150 may transmit a configuration for a periodic resource grant, the configuration indicating a set of parameters for the periodic resource grant; transmit a dynamic indication of a modification to one or more of the set of parameters; and transmit one or more communications via the periodic resource grant based at least in part on the modification. Additionally, or alternatively, as further described in more detail elsewhere herein, the communication manager 150 may transmit a configuration for a periodic resource grant, the configuration indicating a set of parameters for the periodic resource grant; receive a dynamic indication of a modification to one or more of the set of parameters; and receive one or more communications via the periodic resource grant based at least in part on the modification. Additionally, or alternatively, the communication manager 150 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
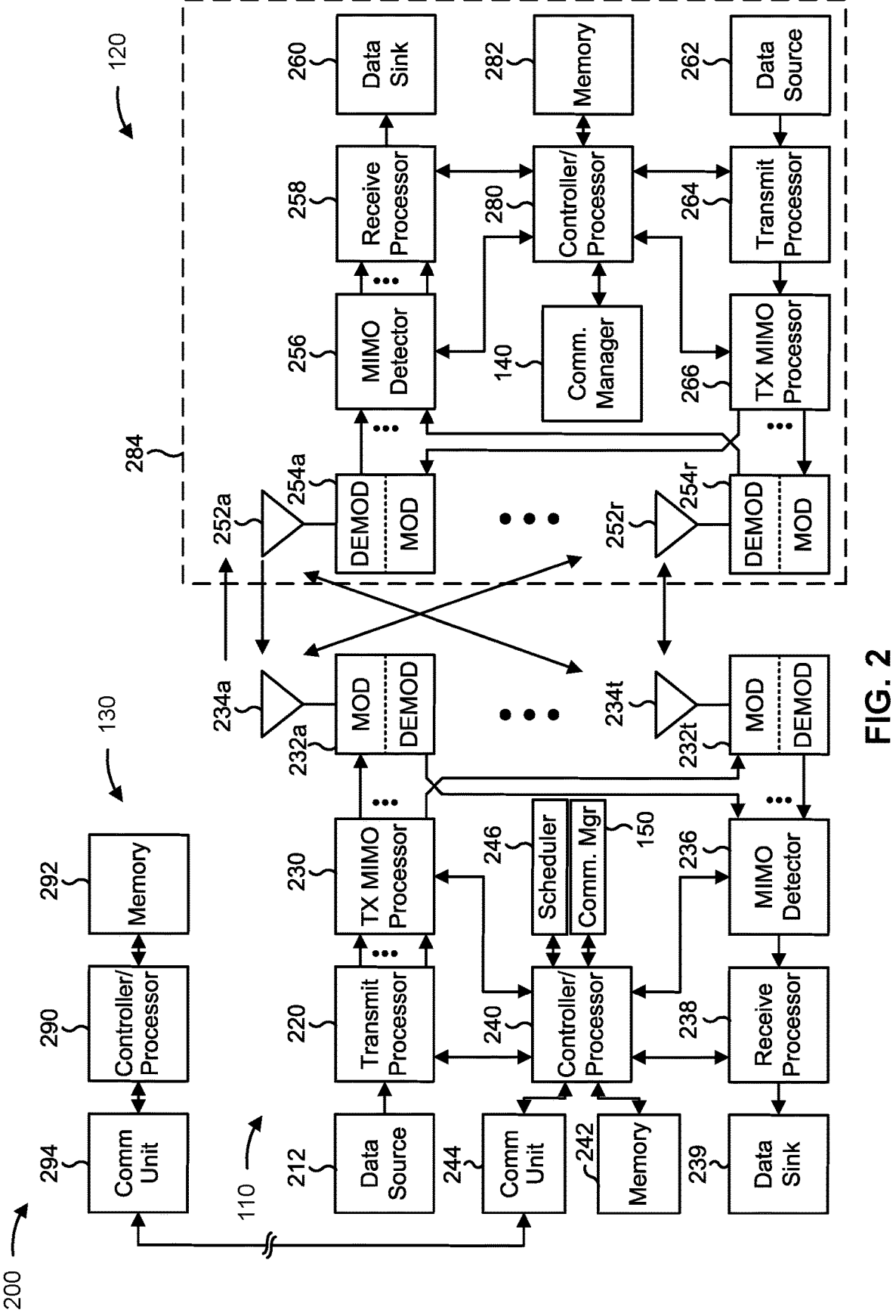
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-15).

The controller/processor 240 of the base station 110, the controller/processor 280 of the UE 120, and/or any other component(s) of FIG. 2 may perform one or more techniques associated with dynamic indications of modifications to a periodic resource grant, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for receiving a configuration for a periodic resource grant, the configuration indicating a set of parameters for the periodic resource grant; means for receiving a dynamic indication of a modification to one or more of the set of parameters; and/or means for receiving one or more communications via the periodic resource grant based at least in part on the modification. In some aspects, the UE 120 includes means for receiving a configuration for a periodic resource grant, the configuration indicating a set of parameters for the periodic resource grant; means for transmitting a dynamic indication of a modification to one or more of the set of parameters; and/or means for transmitting one or more communications via the periodic resource grant based at least in part on the modification. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a configuration for a periodic resource grant, the configuration indicating a set of parameters for the periodic resource grant; means for transmitting a dynamic indication of a modification to one or more of the set of parameters; and/or means for transmitting one or more communications via the periodic resource grant based at least in part on the modification. In some aspects, the network node 110 includes means for transmitting a configuration for a periodic resource grant, the configuration indicating a set of parameters for the periodic resource grant; means for receiving a dynamic indication of a modification to one or more of the set of parameters; and/or means for receiving one or more communications via the periodic resource grant based at least in part on the modification. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
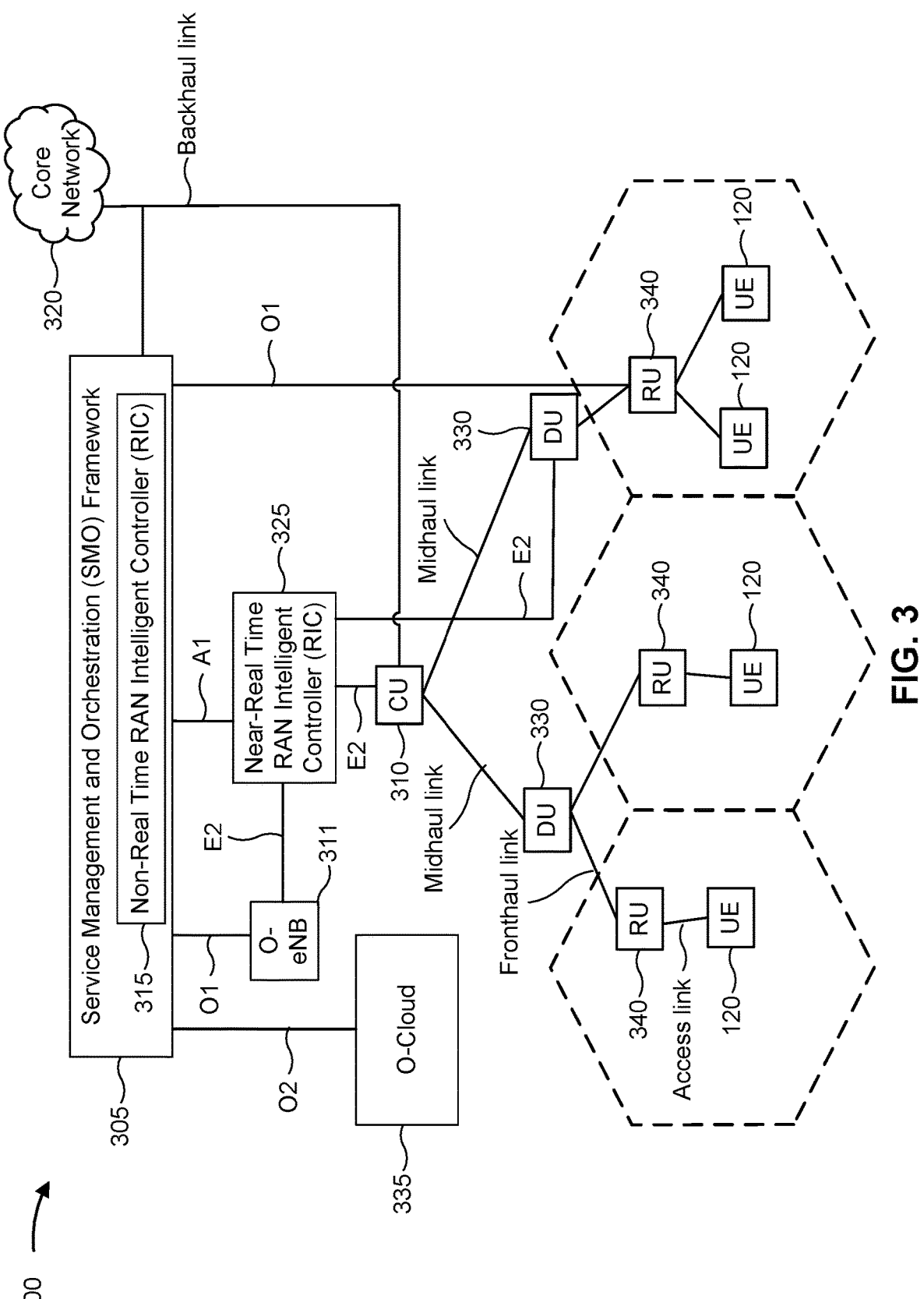
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
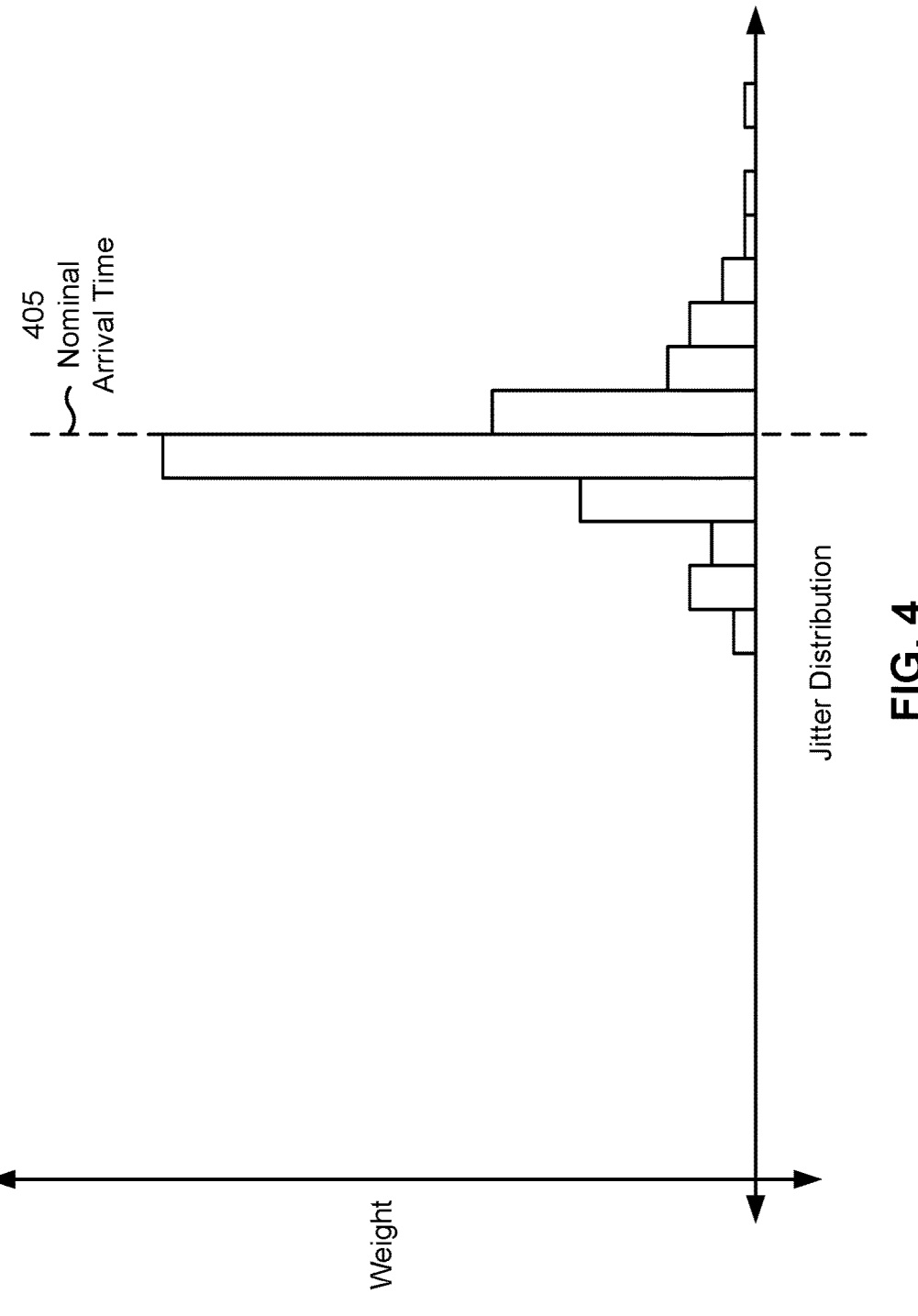
FIG. 4 is a diagram illustrating an example of a jitter distribution, in accordance with the present disclosure.

FIG. 4 is a diagram illustrating an example 400 of a jitter distribution, in accordance with the present disclosure. In some communications, data may be received quasi-periodically. For example, a network (e.g., a network node, such as a core network (CN) network node and/or a RAN network node) may receive data that is generally periodic with an offset from a nominal arrival time 405 that is periodic. The nominal arrival time 405 may be associated with a center of a burst arrival time distribution at a user plane function. The nominal arrival time 405 may have a periodicity that is based at least in part on a multimedia periodicity associated with the communications (e.g., a refresh rate of a video stream and/or extended reality (XR) communications, among other examples).

As shown by example 400, some data may be received before the nominal arrival time 405 (e.g., early arrival data) and some data may be received after the nominal arrival time (e.g., late arrival data). In an example, a jitter distribution may have a spread in traffic arrival time of approximately 10 milliseconds (ms) in downlink traffic arrival times for split XR communications (e.g., where rendering processes are performed by a UE and a network node, such as an edge node).

The data may have jitter (e.g., offset from the nominal arrival time 405) based at least in part on a rendering time, an encoder time, and/or a Real Time Transport Protocol (RTP) packetization time at a device generating or forwarding the data (e.g., an application server).

In some networks, XR downlink traffic may have a burst (e.g., set of data packets associated with one or more scenes) arrival time at the network that is quasi-periodic. The jitter of burst arrival time may be equal to approximately 48% of XR periodicity (e.g., 8 ms vs 16.666 ms). In this way, the jitter highly affects an overall XR system performance of capacity and power consumption when using a packet delay budget (PDB) requirement.

An XR client at the UE may have a de-jitter buffer that saves burst packets until a periodic timing for display. In some examples, the PDB requirement may indicate expiration of data packets that may be on-time to the UE (e.g., with reception before the periodic timing for display by an amount of time to allow for processing before display). In this case, the network node may drop the data packets that may have otherwise been used to provide XR data to the UE. This may cause communication errors associated with the XR data, which may consume computing, power, communication, and/or network resources to detect and correct. Additionally, or alternatively, the communication errors may result in a communication configuration that reduces spectral efficiency based at least in part on the network node attempting to correct and/or reduce the errors.

As indicated above, FIG. 4 is provided as an example. Other examples may differ from what is described with regard to FIG. 4.

Figure 5:
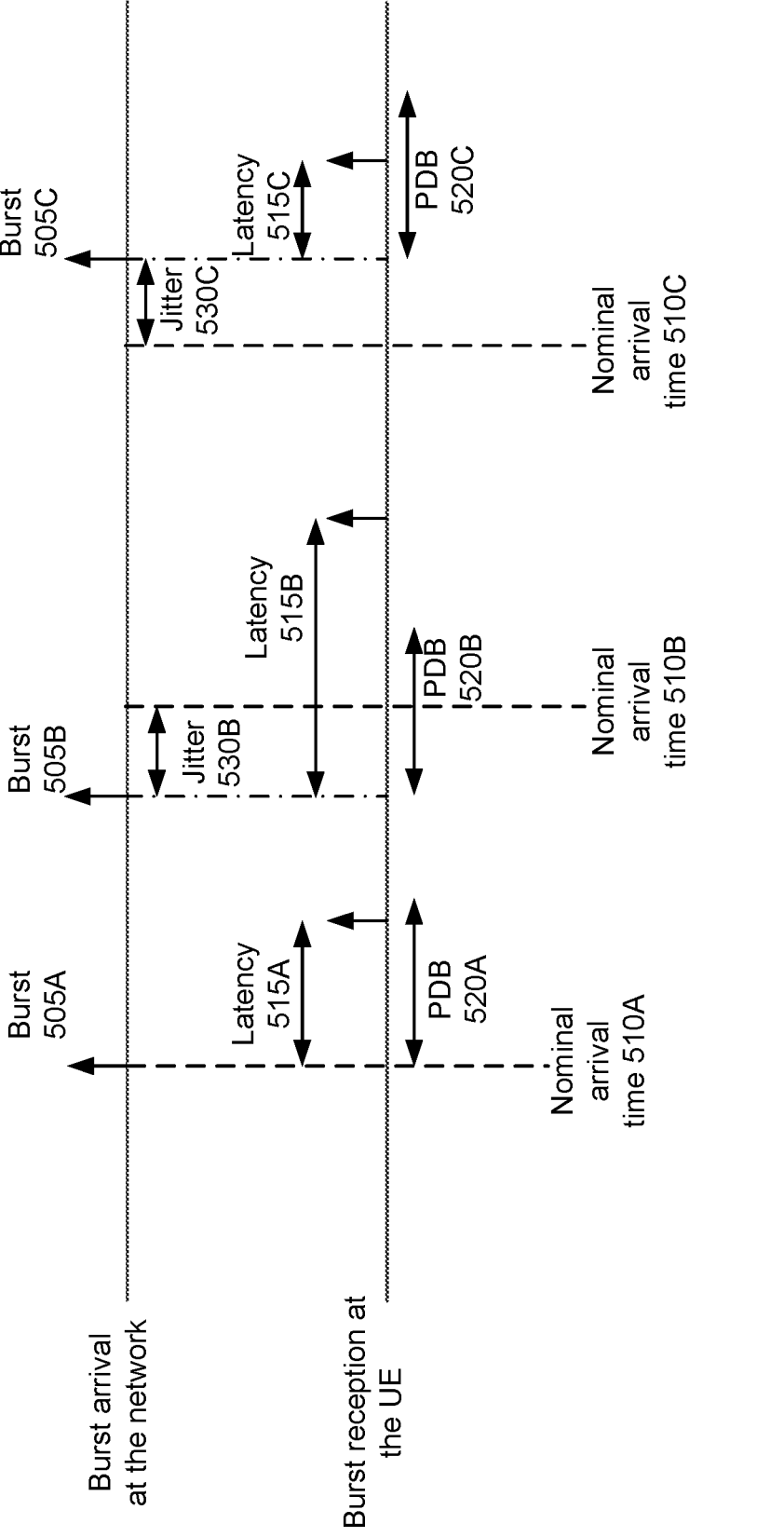
FIGS. 5 and 6 are diagrams illustrating examples of jitter-based communications, in accordance with the present disclosure.

FIG. 5 is a diagram illustrating an example 500 of jitter-based communications, in accordance with the present disclosure.

As shown in FIG. 5, a burst 505A of data packets may be directed to a UE. The burst 505A may arrive at a network (e.g., a network node, such as a RAN network node and/or a CN network node, among other examples) at a time indicated in FIG. 5 relative to a nominal arrival time 510A. The nominal arrival time 510A may be associated with a periodic arrival time, from which the burst 505A may be offset by a jitter. However, the burst 505A may arrive at the nominal arrival time 510A, with a jitter of zero.

The network may transmit the burst 505A with reception at the UE at a time indicated in FIG. 5. An amount of time between arrival at the network and reception at the UE is a latency 515A. The network may determine whether to transmit the burst 505A based at least in part on whether the latency 515A exceeds a PDB A. The PDB 520 indicates an amount of time that the network is able to delay the burst 505A after arrival at the network and before delivery to the UE. If the PDB 520 is exceeded, the network may drop the burst 505A and consider data packets of the burst 505A as expired. The PDB may be established for a communication session associated with the UE and may be a fixed amount of time from arrival at the network. Based at least in part on the latency 515A satisfying the PDB 520A, the network transmits the burst 505A to the UE.

A burst 505B may arrive at the network at a time indicated in FIG. 5 relative to a nominal arrival time 510B. The burst 505B may arrive before the nominal arrival time 510B, with a jitter 530B having a negative value to indicate an arrival time that is before the nominal arrival time 510B.

The network may not transmit the burst 505B based at least in part on an expected reception at the UE at a time indicated in FIG. 5 being outside of a PDB 520B. For example, a latency 515B may be greater than the PDB 520. The network may drop the burst 505B and consider data packets of the burst 505B as expired.

A burst 505C may arrive at the network at a time indicated in FIG. 5 relative to a nominal arrival time 510C. The burst 505C may arrive after the nominal arrival time 510C, with a jitter 530C having a negative value to indicate an arrival time that is after the nominal arrival time 510C.

The network may transmit the burst 505C based at least in part on an expected reception at the UE at a time indicated in FIG. 5 being within the PDB 520C. For example, a latency 515C may be less than the PDB 520. The network may transmit the burst 505B and consider data packets of the burst 505B timely.

In some networks, a network may attempt to prevent transmission of expired data to conserve computing, power, communication, and/or network resources. To prevent transmission of the expired data, the network may configure a PDB with a reduced duration to account for a jitter of the data. For example, the network may reduce the duration of the PDB to prevent an amount of time of a jitter and the duration of the PDB from extending from the nominal arrival time 510C past a deadline for the UE to render the data at the UE. However, reducing a duration of the PDB may result in an increased number of dropped packets, such as those of burst 505B, that may have otherwise been received at the UE before the nominal arrival time 510B. Additionally, or alternatively, the network may reduce communication capacity to ensure that the PDB is satisfied and that packets are not dropped. However, this may reduce a number of devices that may be supported on a cell of the network.

As indicated above, FIG. 5 is provided as an example. Other examples may differ from what is described with regard to FIG. 5.

Figure 6:
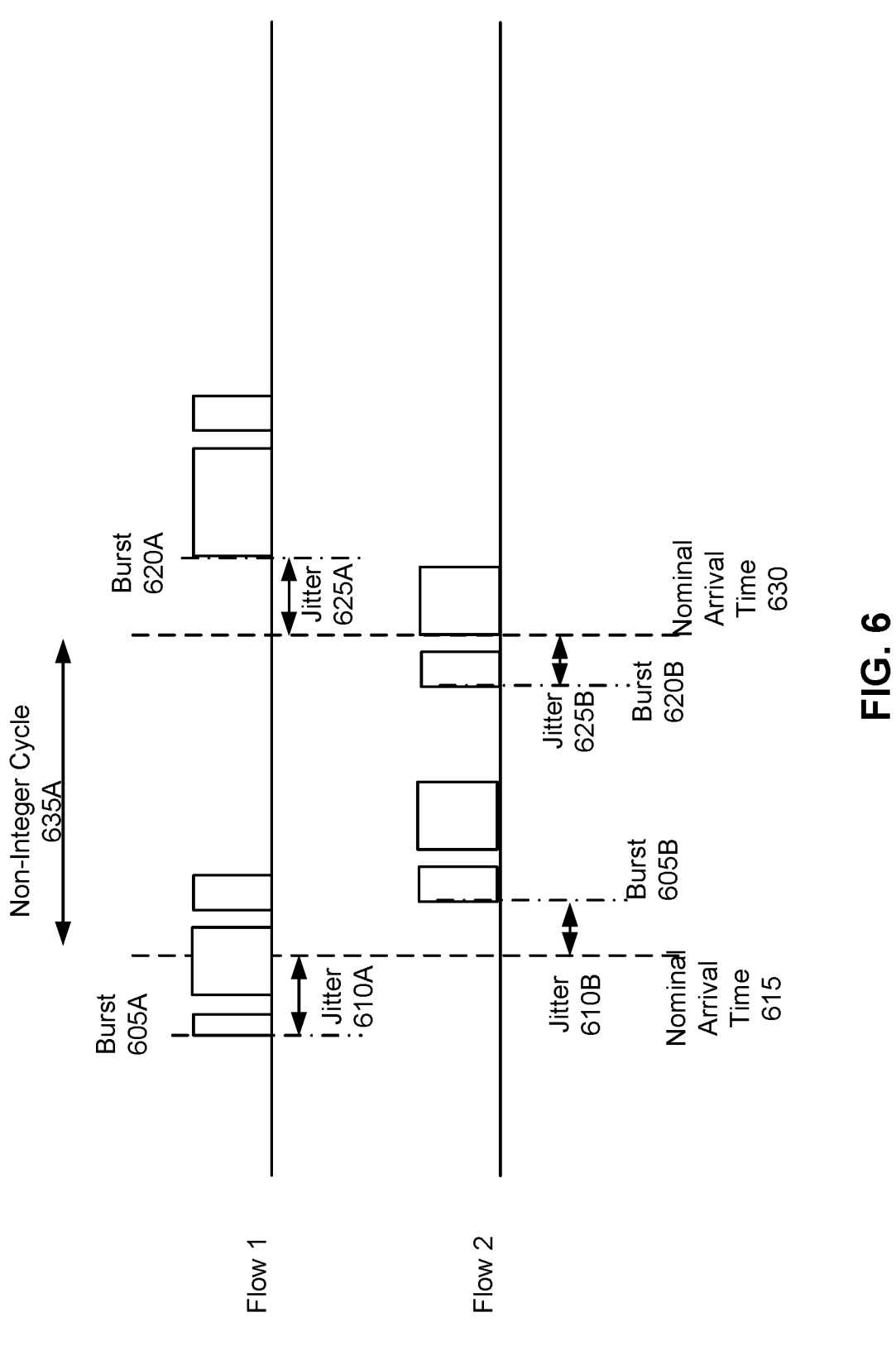

FIG. 6 is a diagram illustrating an example 600 of jitter-based communications, in accordance with the present disclosure.

As shown in FIG. 6, a burst 605A may arrive at a network with a jitter 610A such that the burst 605A arrives before a nominal arrival time 615. The burst 605A may be associated with a first flow of data packets. For example, the first flow may be associated with a first application and/or a first video feed (e.g., an XR video feed).

A burst 605B may arrive at the network with a jitter 610B such that the burst 605B arrives after the nominal arrival time 615. The burst 605B may be associated with a second flow of data packets. For example, the second flow may be associated with a second application and/or a second video feed (e.g., an XR video feed).

A burst 620A of the first flow may arrive at the network with a jitter 625A such that the burst 620A arrives after a nominal arrival time 630. A burst 620B may arrive at the network with a jitter 625B such that the burst 620B arrives before the nominal arrival time 630.

As shown in FIG. 6, an interval between the burst 605A and the burst 620A may be non-integer cycle 635A. Additionally, or alternatively, an interval between the burst 605B and the burst 620B may be non-integer cycle 635A. For example, if an interval is based at least in part on a frames per second metric (e.g., 60 frames per second or 120 frames per second, among other examples), then the interval is a non-integer number of milliseconds (e.g., 16.67 milliseconds (ms) or 8.33 ms, among other examples).

In some networks, based at least in part on jitter, arrival times between bursts may also be inconsistent. For example, in some networks, jitter may indicate timing of a burst in a range of approximately 4 seconds early to approximately 4 seconds late. In some networks, a packet size and/or a number of packets may vary between bursts and/or flows. In some aspects, different flows may have different configurations for parameters, such as size and/or numbers of packets per burst, periodicity, jitter ranges, and/or PDB s, among other examples.

As indicated above, FIG. 6 is provided as an example. Other examples may differ from what is described with regard to FIG. 6.

For data streams, such as XR traffic, packet bursts may be periodic with some jitter in arrival times. Packet sizes and numbers of packets for bursts may be variable. A dynamic grant may be used to handle the data streams, but variability in the packet bursts may consume computing, power, network, and/or communication resources for additional signaling (e.g., via a physical downlink control channel (PDCCH)) and additional decoding (e.g., PDCCH decoding).

A periodic resource grant (e.g., a configured grant (CG) or semi-persistent-scheduling (SPS), among other examples) may be used to handle the data streams. However, variability in numbers of packets, sizes of packets, and non-integer cycles may waste resources and/or cause delay. For example, the network may not know traffic details, so the network may over-allocate resources or under-allocate resources. Over-allocating resources may unnecessarily consume network resources that are not used for transmissions. Under-allocating resources may cause delays, which may disrupt a data flow and/or cause the UE and/or a network node to detect and correct errors caused by delay (e.g., expiration of a PDB that causes the network node to drop packets or reception of the data packets at the UE after a deadline for rendering, among other examples).

In some aspects described herein, a UE may be configured with a periodic resource grant (e.g., an SPS or a CG, among other examples). The UE and/or the network node may dynamically modify one or more parameters of the periodic resource grant (e.g., based at least in part on a flow associated with the periodic resource grant). For example, the UE and/or the network node may indicate a modification to the periodic resource grant via a WUS, parameters of the WUS (e.g., a sequence and/or a channel of the WUS, among other examples), DMRS, parameters of the DMRSs (e.g., a pattern and/or a sequence, among other examples), DCI, an RMI, a MAC CE, an indication piggy-backed on a dynamic grant or a periodic resource grant (e.g., SPS or CG), an indication piggy-backed on a communication scheduled via a dynamic grant or a periodic resource grant, an indication within an uplink control channel (e.g., UCI), and/or an indication within a scheduling request (scheduling request), among other examples.

In some aspects, the modification may include cancelling one or more occasions of the periodic resource grant, shifting in a time domain (e.g., advance or delay), shifting in a frequency domain (e.g., up or down), modifying a parameter of a configuration (e.g., MCS, a number of resource blocks, and/or a number of symbols among other examples), adding one or more additional occasions, and/or indicating a beam change (e.g., via a new transmission configuration indicator (TCI)). In some aspects, an indication of a modification may indicate an occasion utilization (e.g., an on/off pattern) of subsequent occasions of the periodic resource grant. In some aspects, the indication of the modification may apply to a number of occasions or may apply until communication of a new indication of an additional modification or an indication to cancel the modification, among other examples.

In some aspects, one or more communication parameters may be used to improve reliability of communicating the indication of the modification. For example, a receiving device (e.g., the UE in a downlink indication or the network node in an uplink indication) may transmit an acknowledgment (ACK) message. In some aspects, the receiving device may transmit the ACK message based at least in part on a type of modification, such as adding an occasion or modifying a parameter of the configuration, among other examples. In some aspects, the receiving device may piggyback the ACK message on an additional communication based at least in part on receiving the indication via a communication type that is not configured with an allocation for the ACK message (e.g., DCI or a sequence-based indication). In some aspects, the network node may configure a resource for transmitting an ACK for the indication of the modification.

In some aspects, a transmitting device (e.g., the UE in an uplink indication or the network node in a downlink indication) may transmit the indication of the modification with one or more repetitions. For example, the transmitting device may transmit the indication of the modification in a first resource and then transmit a repetition of the indication of the modification in a second resource (e.g., with time diversity, frequency diversity, or spatial diversity, among other examples).

In some aspects, the transmitting device may transmit the indication of the modification in a first resource and then transmit an indication to cancel the modification. For example, the transmitting device may detect a change in traffic conditions that no longer necessitate the modification.

In some aspects, the UE may be configured (e.g., via an indication from the transmitting device and/or a communication protocol) to add additional control channel (e.g., PDCCH) monitoring or additional scheduling request resources. In this way, the network node may have an opportunity to schedule a dynamic grant, or the UE may have an opportunity to request resources based at least in part on a change in traffic conditions (e.g., additional data packets arriving).

In some aspects, the indication of the modification may apply to an uplink periodic resource grant and/or a downlink periodic resource grant. For example, a single message may indicate modifications to one or more periodic resource grants (e.g., multiple periodic resource grants in a same communication direction or periodic resource grants in opposite communication directions).

In some aspects, a modification to an uplink periodic resource grant may be associated with a preconfigured time between the indication of the modification and application of the modification. In this way, the network node may have sufficient time to receive and process the indication of the modification. Similarly, a modification that indicates a beam change may be applied after a configured amount of time. The configured amount of time may be based at least in part on a capability of the UE (e.g., as indicated to the network node).

In some aspects where the modification applies to an uplink periodic resource grant, the UE may piggy-back (e.g., using DCI or MAC CE) the indication of the modification on a subsequent data occasion (e.g., schedule via a dynamic grant or the uplink periodic resource grant, among other examples). In some aspects, the network (e.g., a network node) may be aware of when to transmit a dynamic grant for the UE to transmit the indication of the modification. In some aspects, if the UE determines that the UE needs a physical uplink shared channel (PUSCH) grant in a subsequent resource, the UE may use a CG message to indicate to the network node that the UE needs the dynamic PUSCH grant after an indicated amount of time. For example, the UE may piggy-back the indication and/or the indicated amount of time on a CG message. The indication may include UCI multiplexed in the CG message or multiplexed on a MAC CE associated with the CG message.

In some aspects, an amount of time may be configured between the indication of the modification of parameters of one or more communications of the periodic resource grant and application of the modification. In some aspects, the amount of time may be based at least in part on a capability of the UE.

In some aspects, the modification may apply one or more subsequent occasions of the periodic resource grant. For example, the modification may apply to a number of occasions as indicated in a configuration (e.g., indicated to the UE by the network node or configured in a communication protocol) or in the indication of the modification, among other examples. In some aspects, the modification may apply to occasions until communication of an additional indication of an additional modification.

In some aspects, the network node may determine to transmit the indication of the modification based at least in part on traffic awareness (e.g., jitter statistics and/or a number of packets per burst) at the network node. For example, based at least in part on parameters of the traffic, the network node may determine an appropriate and/or efficient time to indicate the modification to the UE. In some aspects, the network node may determine to transmit the indication of the modification based at least in part on application data unit information that indicates an approximate number of packets per burst and/or a first and/or last packet in a burst. In some aspects, the network node may obtain the application data unit information from an application client at the UE or from an application server (e.g., a source or destination of the bursts of data packets). In some aspects, the network node may predict (e.g., using a machine learning model) the number of packets, packet sizes, and/or jitter between bursts.

In some aspects, the UE may determine to transmit the indication of the modification based at least in part on application data information (e.g., from the application server). The application data information may indicate an end of packet and/or a more data indication, among other examples. In some aspects, the UE may use buffer status information request to determine the modification of the periodic resource grant (e.g., a CG).

Based at least in part on the UE receiving or transmitting a dynamic indication of a modification to one or more of a set of parameters associated with a periodic resource grant, the periodic resource grant may be adaptable to traffic parameters and/or characteristics of a stream with jitter and/or with a non-integer period (e.g., XR data). In this way, the network node and the UE may conserve network resources that may have otherwise been consumed by over-allocating resources to the periodic resource grant. Additionally, or alternatively, the network node and the UE may avoid under-allocating resources to the periodic resource grant. In this way, the network node and the UE may conserve communication, network, power, and computing resources that may have otherwise been consumed for detecting and correcting errors caused by delay from under-allocating resources to the periodic resource grant.

Figure 7:
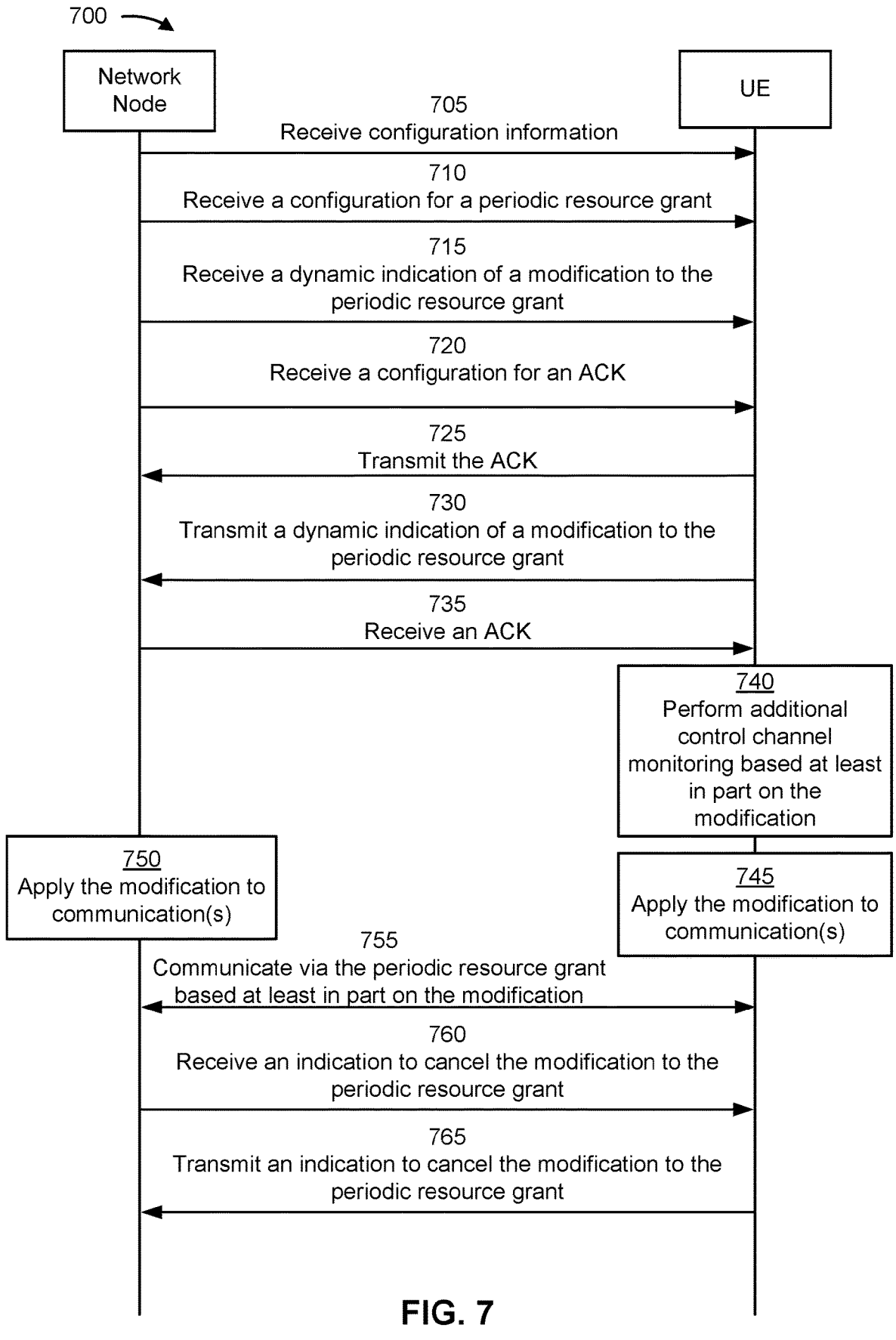
FIGS. 7-9 are diagrams illustrating examples associated with dynamic indications of modifications to a periodic resource grant, in accordance with the present disclosure.

FIG. 7 is a diagram of an example 700 associated with dynamic indications of modifications to a periodic resource grant, in accordance with the present disclosure. As shown in FIG. 7, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown by reference number 705, the network node may transmit, and the UE may receive, configuration information. In some aspects, the UE may receive the configuration information via one or more of RRC signaling, one or more MAC CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to indicate support for dynamic modifications of periodic resource grants, such as CGs or SPSs. In some aspects, the configuration information may indicate that the UE is to indicate what types of modifications that UE supports and/or parameters for applying the modifications. For example, the configuration information may indicate that the UE is to indicate a capability associated with an amount of time required to implement the modifications, such as a beam change.

The UE may configure itself based at least in part on the configuration information. In some aspects, the UE may be configured to perform one or more operations described herein based at least in part on the configuration information.

In some aspects, the UE may transmit the indication of the support for dynamic modifications of periodic resource grants, an indication of supported types of modifications, and/or an indication of parameters for applying the modifications, among other examples.

As shown by reference number 710, the UE may receive, and the network node may transmit, a configuration for a periodic resource grant. For example, the periodic resource grant may include an uplink periodic resource grant (e.g., a CG) or a downlink periodic resource grant (e.g., an SPS-based grant). In some aspects, the configuration may indicate a set of parameters for the periodic resource grant. For example, the configuration may indicate a periodicity and/or an amount or number of resources available during an occasion of the periodic resource grant, among other examples.

As shown by reference number 715, the UE may receive, and the network node may transmit, a dynamic indication of a modification to the periodic resource grant. In some aspects, the UE may receive the dynamic indication via a WUS, DMRSs, DCI, one or more MAC CEs, and/or an indication sent with a dynamic grant, an SPS message, or a CG, among other examples.

In some aspects, the network node may transmit the dynamic indication of the modification with one or more repetitions. For example, the network node may transmit the dynamic indication in a resource and may transmit one or more repetitions in one or more additional resources (e.g., with time diversity, frequency diversity, and/or spatial diversity). In some aspects, the UE may receive one or more repetitions of the dynamic indication of the modification.

In some aspects, the modification includes cancelation of one or more occasions of the periodic resource grant, addition of one or more additional occasions, a shift in time of the one or more occasions, and/or a shift in frequency of the one or more occasions, among other examples. In some aspects, the modification includes a change of parameters of one or more communications of the one or more occasions (e.g., a change to an MCS, a change to a number of resource blocks, a change to a number of symbols, and/or a change to a reference signal pattern, among other examples), a change in a beam for the one or more occasions, and/or a utilization pattern for the one or more occasions, among other examples.

In some aspects, the dynamic indication of the modification may apply to one or more periodic resource grants. For example, the dynamic indication of the modification may apply to a downlink periodic resource grant, multiple downlink periodic resource grants, an uplink periodic resource grant, and/or multiple uplink periodic resource grants, among other examples.

In some aspects, the network node my transmit the dynamic indication of the modification based at least in part on traffic characteristics of the one or more communications, jitter of the one or more communications, a number of packets per burst associated with the one or more communications, and/or sizes of the packets associated with the one or more communications, among other examples. For example, the network node may determine that an occasion may not be used based at least in part on having no traffic to communicate during the occasion. Additionally, or alternatively, the network node may determine to shift an occasion to accommodate an expected early or late arrival time relative to an unmodified start time of the occasion.

In some aspects, the network node may transmit (e.g., with or separately from the ACK) an indication of one or more additional scheduling request resources based at least in part on the modification comprising cancelation of the one or more occasions of the periodic resource grant. For example, the network node may provide the UE with resources for requesting a transmission resource for transmitting unexpected data to the network node.

As shown by reference number 720, the UE may receive, and the network node may transmit, a configuration for an ACK (e.g., receiving or transmitting the ACK) for the dynamic indication of the modification transmitted by the network node. In some aspects, the network node may transmit an indication of a configuration for transmitting the indication of the acknowledgment. For example, based at least in part on the dynamic indication of the modification not having a configured resource for an ACK, the network node may indicate (e.g., dynamically) a resource for the UE to transmit the ACK.

As shown by reference number 725, the UE may transmit, and the network node may receive, the ACK associated with the dynamic indication of the modification. In some aspects, the UE may transmit the ACK to indicate that the UE is to apply the modification for subsequent communications.

As shown by reference number 730, the UE may transmit, and the network node may receive, a dynamic indication of a modification to the periodic resource grant.

In some aspects, the UE may transmit the dynamic indication of the modification with one or more repetitions. For example, the UE may transmit the dynamic indication in a resource and may transmit one or more repetitions in one or more additional resources (e.g., with time diversity, frequency diversity, and/or spatial diversity). In some aspects, the network node may receive one or more repetitions of the dynamic indication of the modification.

In some aspects, the UE may transmit the dynamic indication of the modification via RSs (e.g., DMRSs, phase tracking reference signals (PT-RSs), tracking reference signals (TRSs, among other examples), RMI, MAC CEs, and/or an indication sent with a scheduling request (SR), among other examples. In some aspects, the UE may transmit the dynamic indication of the modification via an indication multiplexed with an uplink communication scheduled via the periodic resource grant and/or an indication multiplexed with a MAC CE associated with the uplink communication scheduled via the periodic resource grant.

In some aspects, the modification includes cancelation of one or more occasions of the periodic resource grant, addition of one or more additional occasions, a shift in time of the one or more occasions, and/or a shift in frequency of the one or more occasions, among other examples. In some aspects, the modification includes a change of parameters of one or more communications of the one or more occasions (e.g., a change to an MCS, a change to a number of resource blocks, a change to a number of symbols, and/or a change to a reference signal pattern, among other examples), a change in a beam for the one or more occasions, and/or a utilization pattern for the one or more occasions, among other examples.

In some aspects, the dynamic indication of the modification may apply to one or more periodic resource grants. For example, the dynamic indication of the modification may apply to a downlink periodic resource grant, multiple downlink periodic resource grants, an uplink periodic resource grant, and/or multiple uplink periodic resource grants, among other examples.

In some aspects, the UE my transmit the dynamic indication of the modification based at least in part on a buffer status associated for data packets of an application associated with the one or more communications, a number of packets per burst associated with the one or more communications, and/or sizes of the packets associated with the one or more communications. For example, the UE may determine that an occasion may not be used based at least in part on having no traffic to communicate during the occasion. Additionally, or alternatively, the UE may determine to shift an occasion to accommodate an expected early or late arrival time relative to an unmodified start time of the occasion.

In some aspects, the network node may transmit (e.g., with or separately from the ACK) an indication of one or more additional scheduling request resources based at least in part on the modification comprising cancelation of the one or more occasions of the periodic resource grant. For example, the network node may provide the UE with resources for requesting a transmission resource for transmitting unexpected data to the network node.

In some aspects, operations described in connection with reference numbers 730 and 735 may be performed independently from operations described in connection with reference numbers 715-725. For example, the operations described in connection with reference numbers 730 and 735 may be performed in a different aspect than the operations described in connection with reference numbers 715-725. Alternatively, the described in connection with reference numbers 730 and 735 may be performed in addition to the operations described in connection with reference numbers 715-725

As shown by reference number 735, the UE may receive an ACK for the dynamic indication of the modification transmitted by the UE. In some aspects, the network node may transmit the ACK to indicate that the network node is to apply the modification for subsequent communications.

As shown by reference number 740, the UE may perform additional control channel monitoring based at least in part on the modification. For example, the UE may monitor with increased density (e.g., reduced sparseness) and/or with additional computing resources to detect DCI for scheduling a downlink communication or an uplink communication. In some aspects, the UE may perform additional control channel monitoring based at least in part on the modification comprising cancelation of the one or more occasions of the periodic resource grant.

As shown by reference number 745, the UE may apply the modification to one or more communications. In some aspects, applying the modification to one or more communications may be delayed based at least in part on a capability of the UE to process and/or apply the modification and/or based at least in part on a configuration in a communication protocol.

In some aspects, the UE may apply the modification to multiple communications of the one or more communications based at least in part on an indicated number of communications (e.g., indicated in or in connection with the dynamic indication of the modification of reference numbers 715 and/or 730), a configured number of communications (e.g., indicated in the configuration information of reference number 705), a configuration within a communication protocol, and/or receiving the multiple communications before receiving an indication of an additional modification or an indication to cancel the modification, among other examples. For example, the UE may apply the modification to multiple communications until receiving an indication to cancel the modification or to apply an additional modification.

As shown by reference number 750, the network node may apply the modification to one or more communications. In some aspects, applying the modification to one or more communications may be delayed based at least in part on an indicated capability of the UE to process and/or apply the modification and/or based at least in part on a configuration in a communication protocol.

In some aspects, the network node may apply the modification to multiple communications of the one or more communications based at least in part on an indicated number of communications (e.g., indicated in or in connection with the dynamic indication of the modification of reference numbers 715 and/or 730), a configured number of communications (e.g., indicated in the configuration information of reference number 705), a configuration within a communication protocol, and/or receiving the multiple communications before receiving an indication of an additional modification or an indication to cancel the modification, among other examples. For example, the network node may apply the modification to multiple communications until receiving an indication to cancel the modification or to apply an additional modification.

As shown by reference number 755, the UE and the network node may communicate via the periodic resource grant based at least in part on the modification (e.g., having the modification applied). For example, the UE may receive one or more communications via the periodic resource grant based at least in part on the modification. In some aspects, the UE and the network node may apply communications having the modification applied after a modification time period from the transmission and/or reception of the dynamic indication of the modification (e.g., as describe in connection with reference numbers 715 and/or 730). In some aspects, the modification time period is based at least in part on a configuration indicated from a network node, a capability of the UE, and/or a configuration indicated in a communication protocol, among other examples.

As shown by reference number 760, the UE may receive, and the network node may transmit, an indication to cancel the modification to the periodic resource grant. In some aspects, the network node may transmit the indication to cancel the modification based at least in part on a change in traffic conditions. For example, a previous indication to cancel an occasion may be withdrawn based at least in part on the network node receiving data packets to transmit during the occasion.

As shown by reference number 765, the UE may transmit, and the network node may receive, an indication to cancel the modification to the periodic resource grant. In some aspects, the UE may transmit the indication to cancel the modification based at least in part on a change in traffic conditions. For example, a previous indication to cancel an occasion may be withdrawn based at least in part on the UE generating data packets for transmission during the occasion.

Based at least in part on the UE receiving or transmitting a dynamic indication of a modification to one or more of a set of parameters associated with a periodic resource grant, the periodic resource grant may be adaptable to traffic parameters and/or characteristics of a stream with jitter and/or with a non-integer period (e.g., XR data). In this way, the network node and the UE may conserve network resources that may have otherwise been consumed by over-allocating resources to the periodic resource grant. Additionally, or alternatively, the network node and the UE may avoid under-allocating resources to the periodic resource grant. In this way, the network node and the UE may conserve communication, network, power, and computing resources that may have otherwise been consumed for detecting and correcting errors caused by delay from under-allocating resources to the periodic resource grant.

As indicated above, FIG. 7 is provided as an example. Other examples may differ from what is described with respect to FIG. 7.

Figure 8:
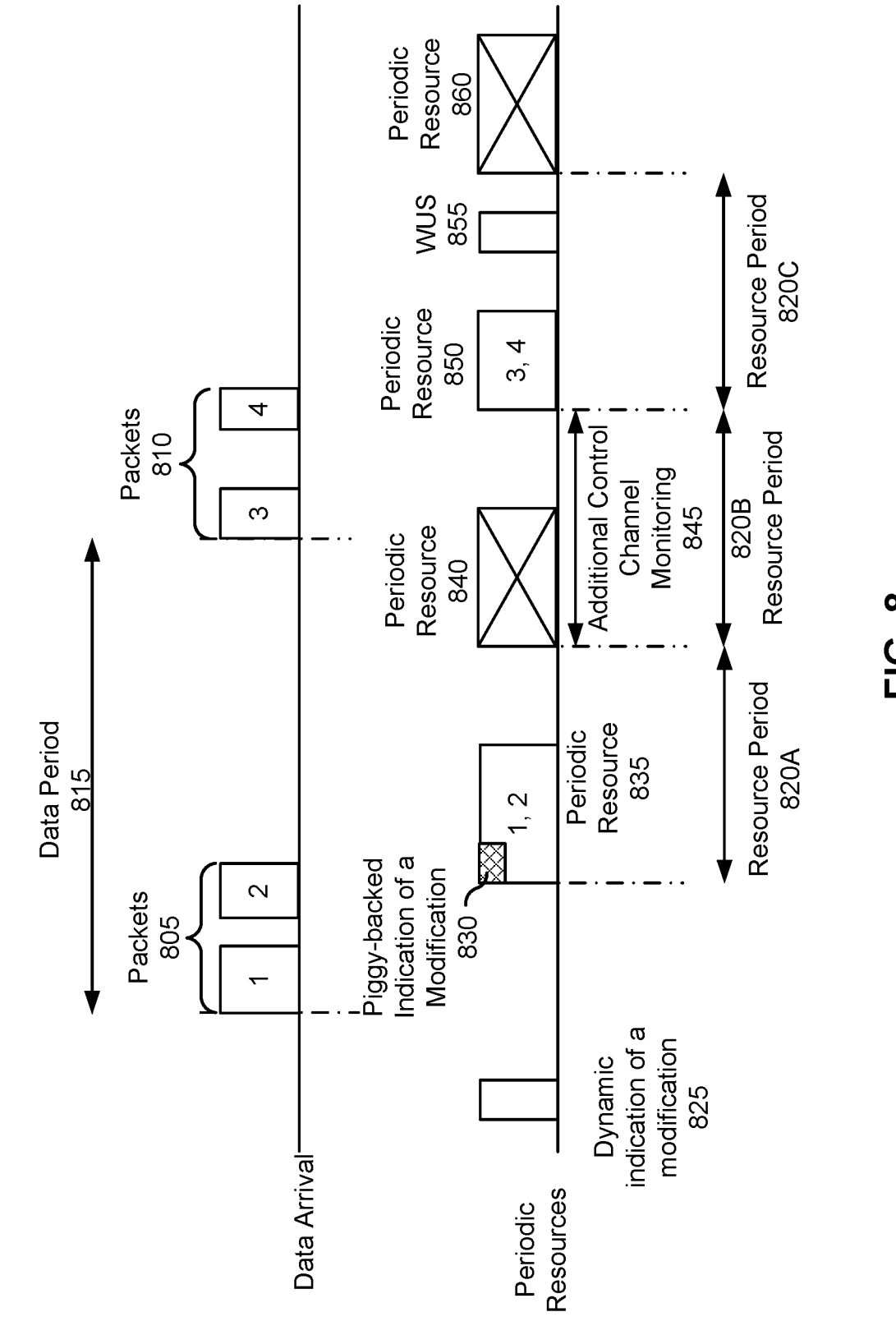

FIG. 8 is a diagram of an example 800 associated with dynamic indications of modifications to a periodic resource grant, in accordance with the present disclosure. As shown in FIG. 8, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 8.

As shown in FIG. 8, the UE or the network node may transmit a dynamic indication of a modification to a periodic resource grant (e.g., a modification to one or more parameters of the periodic resource grant). In example 800, packets 805 arrive at a transmitting device (e.g., the UE or the network node) having packet 1 and packet 2 (e.g., in a burst). The transmitting device also receives packets 810 having packet 3 and 4 after a data period 815 (e.g., with or without a jitter).

The transmitting device and a receiving device are configured with periodic resources for communicating the packets 805 and 810. However, resource periods 820 do not match up with the data period 815. In some aspects, the transmitting device may transmit a dynamic indication of a modification to the periodic resource grant. For example, the transmitting device may transmit a dynamic indication of the modification 825 as control information (e.g., DCI or UCI). In some aspects, the transmitting device may transmit a piggy-backed indication of the modification 830 as a multiplexed indication with a communication of the periodic resource grant. For example, the piggy-backed indication of the modification 830 may be multiplexed on the periodic resource 835 with packets 1 and 2 during resource period 820A.

In some aspects, the dynamic indication of the modification 825 and/or the piggy-backed indication of the modification 830 may indicate to skip periodic resource 840 in resource period 820B. Based at least in part on skipping the periodic resource 840, the UE may perform additional control channel monitoring 845 during the resource period 820B.

Additionally, or alternatively, the dynamic indication of the modification 825 and/or the piggy-backed indication of the modification 830 may indicate that the periodic resource 850 is to be shortened with a decreased time duration. For example, the dynamic indication of the modification 825 and/or the piggy-backed indication of the modification 830 may indicate that periodic resource 850 is to be shortened based at least in part on packets 3 and 4 having a size that does not require a full-length periodic resource.

In some aspects, the transmitting device (e.g., the network node) may transmit the dynamic indication of the modification via a WUS 855. In some aspects, the dynamic indication of the modification received via the WUS 855 may indicate a modification to periodic resource 860 (e.g., cancelation of the periodic resource 860).

As indicated above, FIG. 8 is provided as an example. Other examples may differ from what is described with respect to FIG. 8. For example, the transmitting device may use a different type of resource for transmitting the dynamic indication of the modification and/or the modification may be different from those shown in FIG. 8.

Figure 9:
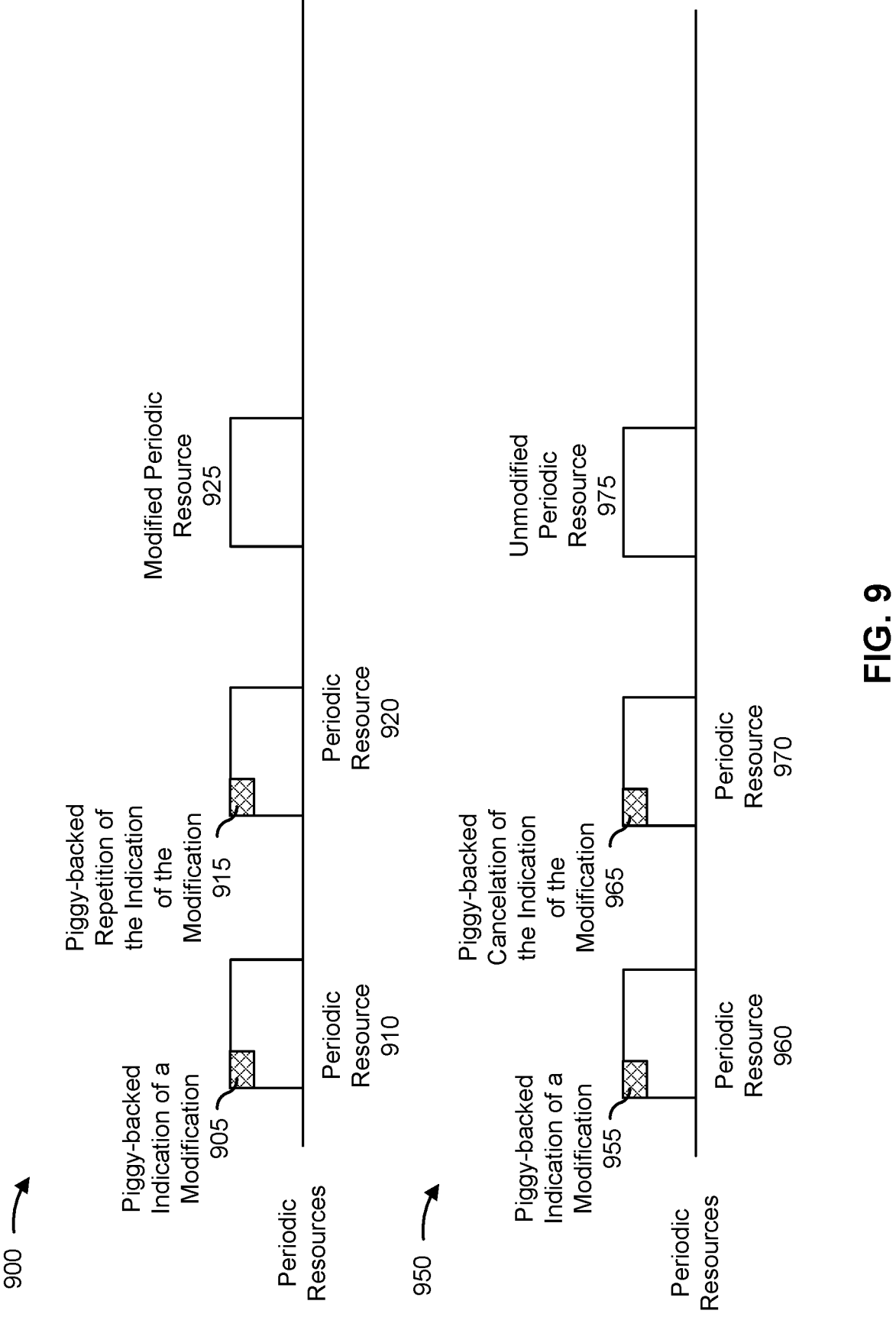

FIG. 9 is a diagram of examples 900 and 950 associated with dynamic indications of modifications to a periodic resource grant, in accordance with the present disclosure. As shown in FIG. 9, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 9.

As shown in example 900, a transmitting device (e.g., the network node or the UE) may transmit a piggy-backed indication of a modification 905 that is piggy-backed on a communication transmitted in a periodic resource 910. Additionally, the transmitting device may transmit a piggy-backed repetition of the indication of the modification 915 that is piggy-backed on a communication transmitted in a periodic resource 920. In some aspects, the piggy-backed indication of the modification 905 and the piggy-backed repetition of the indication of the modification 915 may both apply to a modified periodic resource 925.

As shown in example 950, a transmitting device (e.g., the network node or the UE) may transmit a piggy-backed indication of a modification 955 that is piggy-backed on a communication transmitted in a periodic resource 960. After transmitting the piggy-backed indication of the modification 955, the transmitting device may transmit a piggy-backed cancelation of the indication of the modification 965 that is piggy-backed on a communication transmitted in a periodic resource 970. In some aspects, the transmitting device may transmit the piggy-backed cancelation of the indication of the modification 965 based at least in part on detecting a change in traffic patterns and/or parameters. Based at least in part on the piggy-backed cancelation of the indication of the modification 965, the transmitting device and the network node may communication via an unmodified periodic resource 975.

As indicated above, FIG. 9 is provided as an example. Other examples may differ from what is described with respect to FIG. 9. For example, the transmitting device may use a different type of resource for transmitting the dynamic indication of the modification and/or the modification may be different from those shown in FIG. 9.

Figure 10:
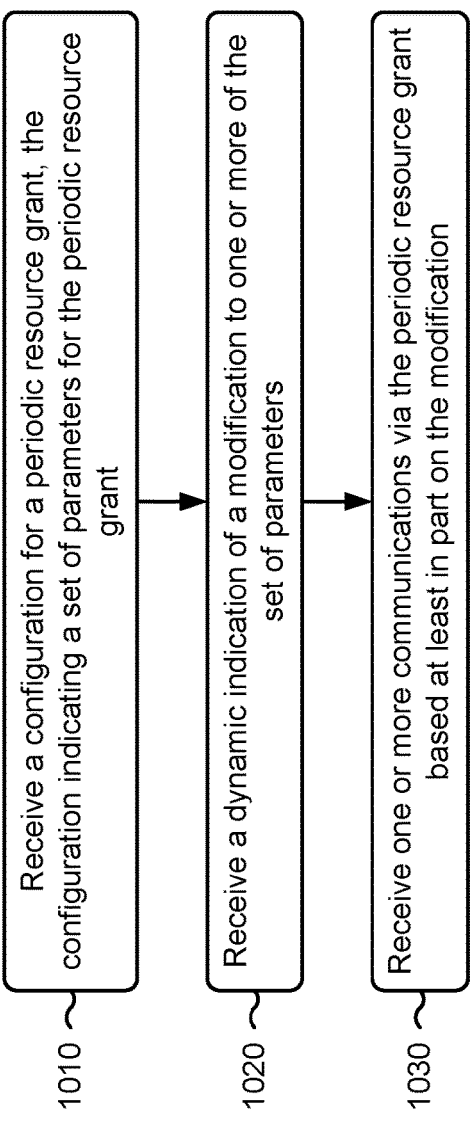

FIG. 10 is a diagram illustrating an example process 1000 performed, for example, by a UE, in accordance with the present disclosure. Example process 1000 is an example where the UE (e.g., UE 120) performs operations associated with dynamic indications of modifications to a periodic resource grant.

As shown in FIG. 10, in some aspects, process 1000 may include receiving a configuration for a periodic resource grant, the configuration indicating a set of parameters for the periodic resource grant (block 1010). For example, the UE (e.g., using communication manager 140 and/or reception component 1402, depicted in FIG. 14) may receive a configuration for a periodic resource grant, the configuration indicating a set of parameters for the periodic resource grant, as described above.

As further shown in FIG. 10, in some aspects, process 1000 may include receiving a dynamic indication of a modification to one or more of the set of parameters (block 1020). For example, the UE (e.g., using communication manager 140 and/or reception component 1402, depicted in FIG. 14) may receive a dynamic indication of a modification to one or more of the set of parameters, as described above.

As further shown in FIG. 10, in some aspects, process 1000 may include receiving one or more communications via the periodic resource grant based at least in part on the modification (block 1030). For example, the UE (e.g., using communication manager 140 and/or reception component 1402, depicted in FIG. 14) may receive one or more communications via the periodic resource grant based at least in part on the modification, as described above.

Process 1000 may include additional aspects, such as any single aspect or any combination of aspects described below and/or in connection with one or more other processes described elsewhere herein.

In a first aspect, receiving the dynamic indication of the modification comprises receiving the dynamic indication via one or more of a WUS, DMRSs, DCI, one or more MAC CEs, or an indication sent with a dynamic grant, an SPS message, or a CG.

In a second aspect, alone or in combination with the first aspect, the modification comprises one or more of cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

In a third aspect, alone or in combination with one or more of the first and second aspects, the change of parameters of the one or more communications comprises a change to an MCS, a change to a number of resource blocks, a change to a number of symbols, or a change to a reference signal pattern.

In a fourth aspect, alone or in combination with one or more of the first through third aspects, process 1000 includes performing additional control channel monitoring based at least in part on the modification comprising cancelation of the one or more occasions of the periodic resource grant.

In a fifth aspect, alone or in combination with one or more of the first through fourth aspects, process 1000 includes transmitting an indication of an acknowledgment of the dynamic indication of the modification.

In a sixth aspect, alone or in combination with one or more of the first through fifth aspects, process 1000 includes receiving an indication of a configuration for transmitting the indication of the acknowledgment.

In a seventh aspect, alone or in combination with one or more of the first through sixth aspects, receiving the dynamic indication of the modification comprises receiving one or more repetitions of the dynamic indication of the modification.

In an eighth aspect, alone or in combination with one or more of the first through seventh aspects, process 1000 includes receiving, after receiving the dynamic indication of the modification, an indication to cancel the modification.

In a ninth aspect, alone or in combination with one or more of the first through eighth aspects, the dynamic indication of the modification applies to one or more of a downlink periodic resource grant, multiple downlink periodic resource grants, an uplink periodic resource grant, or multiple uplink periodic resource grants.

In a tenth aspect, alone or in combination with one or more of the first through ninth aspects, receiving the one or more communications via the periodic resource grant based at least in part on the modification comprises receiving the one or more communications having the modification applied after a modification time period.

In an eleventh aspect, alone or in combination with one or more of the first through tenth aspects, the modification time period is based at least in part on one or more of a configuration indicated from a network node, a capability of the UE, or a configuration indicated in a communication protocol.

In a twelfth aspect, alone or in combination with one or more of the first through eleventh aspects, process 1000 includes applying the modification to multiple communications of the one or more communications based at least in part on an indicated number of communications, a configured number of communications, a configuration within a communication protocol, or receiving the multiple communications before receiving an indication of an additional modification or an indication to cancel the modification.

In a thirteenth aspect, alone or in combination with one or more of the first through twelfth aspects, receiving the dynamic indication of the modification is based at least in part on one or more of traffic characteristics of the one or more communications, jitter of the one or more communications, a number of packets per burst associated with the one or more communications, or sizes of the packets associated with the one or more communications.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
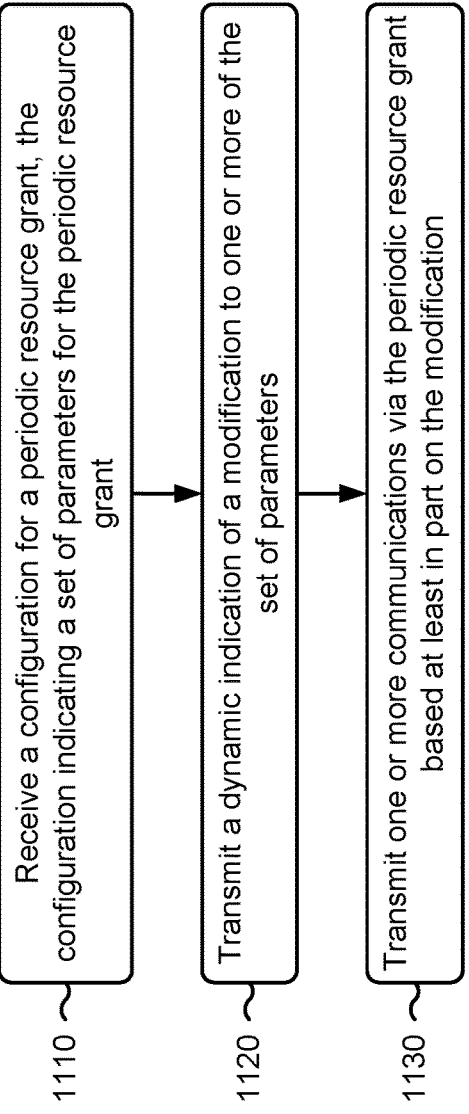

FIG. 11 is a diagram illustrating an example process 1100 performed, for example, by a UE, in accordance with the present disclosure. Example process 1100 is an example where the UE (e.g., UE 120) performs operations associated with dynamic indications of modifications to a periodic resource grant.

As shown in FIG. 11, in some aspects, process 1100 may include receiving a configuration for a periodic resource grant, the configuration indicating a set of parameters for the periodic resource grant (block 1110). For example, the UE (e.g., using communication manager 140 and/or reception component 1402, depicted in FIG. 14) may receive a configuration for a periodic resource grant, the configuration indicating a set of parameters for the periodic resource grant, as described above.

As further shown in FIG. 11, in some aspects, process 1100 may include transmitting a dynamic indication of a modification to one or more of the set of parameters (block 1120). For example, the UE (e.g., using communication manager 140 and/or transmission component 1404, depicted in FIG. 14) may transmit a dynamic indication of a modification to one or more of the set of parameters, as described above.

As further shown in FIG. 11, in some aspects, process 1100 may include transmitting one or more communications via the periodic resource grant based at least in part on the modification (block 1130). For example, the UE (e.g., using communication manager 140 and/or transmission component 1404, depicted in FIG. 14) may transmit one or more communications via the periodic resource grant based at least in part on the modification, as described above.

Process 1100 may include additional aspects, such as any single aspect or any combination of aspects described below and/or in connection with one or more other processes described elsewhere herein.

In a first aspect, transmitting the dynamic indication of the modification comprises transmitting the dynamic indication via one or more of reference signals (e.g., DMRSs), an RMI, one or more MAC CEs, or an indication sent with an SR.

In a second aspect, alone or in combination with the first aspect, transmitting the dynamic indication of the modification comprises transmitting the dynamic indication via an indication multiplexed with an uplink communication scheduled via the periodic resource grant, or an indication multiplexed with a MAC CE associated with the uplink communication scheduled via the periodic resource grant.

In a third aspect, alone or in combination with one or more of the first and second aspects, the modification comprises one or more of cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

In a fourth aspect, alone or in combination with one or more of the first through third aspects, the change of parameters of the one or more communications comprises a change to an MCS, a change to a number of resource blocks, a change to a number of symbols, or a change to a reference signal pattern.

In a fifth aspect, alone or in combination with one or more of the first through fourth aspects, process 1100 includes receiving an indication of one or more additional scheduling request resources based at least in part on the modification comprising cancelation of the one or more occasions of the periodic resource grant.

In a sixth aspect, alone or in combination with one or more of the first through fifth aspects, process 1100 includes receiving an indication of an acknowledgment of the dynamic indication.

In a seventh aspect, alone or in combination with one or more of the first through sixth aspects, process 1100 includes receiving an indication of a configuration for receiving the indication of the acknowledgment.

In an eighth aspect, alone or in combination with one or more of the first through seventh aspects, transmitting the dynamic indication of the modification comprises transmitting one or more repetitions of the dynamic indication of the modification.

In a ninth aspect, alone or in combination with one or more of the first through eighth aspects, process 1100 includes transmitting, after transmitting the dynamic indication of the modification, an indication to cancel the modification.

In a tenth aspect, alone or in combination with one or more of the first through ninth aspects, the dynamic indication of the modification applies to one or more of a downlink periodic resource grant, multiple downlink periodic resource grants, an uplink periodic resource grant, or multiple uplink periodic resource grants.

In an eleventh aspect, alone or in combination with one or more of the first through tenth aspects, transmitting the one or more communications via the periodic resource grant based at least in part on the modification comprises transmitting the one or more communications having the modification applied after a modification time period.

In a twelfth aspect, alone or in combination with one or more of the first through eleventh aspects, the modification time period is based at least in part on one or more of a configuration indicated from a network node, a capability of the UE, or a configuration indicated in a communication protocol.

In a thirteenth aspect, alone or in combination with one or more of the first through twelfth aspects, process 1100 includes applying the modification to multiple communications of the one or more communications based at least in part on an indicated number of communications, a configured number of communications, a configuration within a communication protocol, or transmitting the multiple communications before transmitting an indication of an additional modification or an indication to cancel the modification.

In a fourteenth aspect, alone or in combination with one or more of the first through thirteenth aspects, transmitting the dynamic indication of the modification is based at least in part on one or more of a buffer status associated for data packets of an application associated with the one or more communications, a number of packets per burst associated with the one or more communications, or sizes of the packets associated with the one or more communications.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
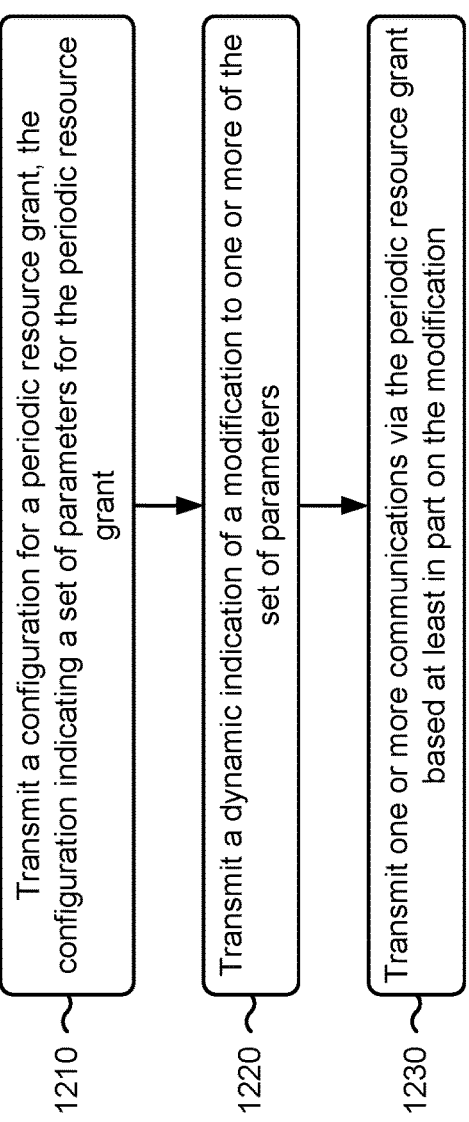

FIG. 12 is a diagram illustrating an example process 1200 performed, for example, by a network node, in accordance with the present disclosure. Example process 1200 is an example where the network node (e.g., a base station 110, a CU, a DU, and/or an RU) performs operations associated with dynamic indications of modifications to a periodic resource grant.

As shown in FIG. 12, in some aspects, process 1200 may include transmitting a configuration for a periodic resource grant, the configuration indicating a set of parameters for the periodic resource grant (block 1210). For example, the network node (e.g., using communication manager 150 and/or transmission component 1504, depicted in FIG. 15) may transmit a configuration for a periodic resource grant, the configuration indicating a set of parameters for the periodic resource grant, as described above.

As further shown in FIG. 12, in some aspects, process 1200 may include transmitting a dynamic indication of a modification to one or more of the set of parameters (block 1220). For example, the network node (e.g., using communication manager 150 and/or transmission component 1504, depicted in FIG. 15) may transmit a dynamic indication of a modification to one or more of the set of parameters, as described above.

As further shown in FIG. 12, in some aspects, process 1200 may include transmitting one or more communications via the periodic resource grant based at least in part on the modification (block 1230). For example, the network node (e.g., using communication manager 150 and/or transmission component 1504, depicted in FIG. 15) may transmit one or more communications via the periodic resource grant based at least in part on the modification, as described above.

Process 1200 may include additional aspects, such as any single aspect or any combination of aspects described below and/or in connection with one or more other processes described elsewhere herein.

In a first aspect, transmitting the dynamic indication of the modification comprises transmitting the dynamic indication via one or more of a WUS, reference signals (e.g., DMRSs), DCI, one or more MAC CEs, or an indication sent with a dynamic grant, an SPS message, or a CG.

In a second aspect, alone or in combination with the first aspect, the modification comprises one or more of cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

In a third aspect, alone or in combination with one or more of the first and second aspects, the change of parameters of the one or more communications comprises a change to an MCS, a change to a number of resource blocks, a change to a number of symbols, or a change to a reference signal pattern.

In a fourth aspect, alone or in combination with one or more of the first through third aspects, process 1200 includes transmitting an indication to perform additional control channel monitoring based at least in part on the modification comprising cancelation of the one or more occasions of the periodic resource grant.

In a fifth aspect, alone or in combination with one or more of the first through fourth aspects, process 1200 includes receiving an indication of an acknowledgment of the dynamic indication of the modification.

In a sixth aspect, alone or in combination with one or more of the first through fifth aspects, process 1200 includes transmitting an indication of a configuration for transmitting the indication of the acknowledgment.

In a seventh aspect, alone or in combination with one or more of the first through sixth aspects, transmitting the dynamic indication of the modification comprises transmitting one or more repetitions of the dynamic indication of the modification.

In an eighth aspect, alone or in combination with one or more of the first through seventh aspects, process 1200 includes transmitting, after transmitting the dynamic indication of the modification, an indication to cancel the modification.

In a ninth aspect, alone or in combination with one or more of the first through eighth aspects, the dynamic indication of the modification applies to one or more of a downlink periodic resource grant, multiple downlink periodic resource grants, an uplink periodic resource grant, or multiple uplink periodic resource grants.

In a tenth aspect, alone or in combination with one or more of the first through ninth aspects, transmitting the one or more communications via the periodic resource grant based at least in part on the modification comprises transmitting the one or more communications having the modification applied after a modification time period.

In an eleventh aspect, alone or in combination with one or more of the first through tenth aspects, the modification time period is based at least in part on one or more of a configuration indicated to a UE, a capability of the UE, or a configuration indicated in a communication protocol.

In a twelfth aspect, alone or in combination with one or more of the first through eleventh aspects, process 1200 includes applying the modification to multiple communications of the one or more communications based at least in part on an indicated number of communications, a configured number of communications, a configuration within a communication protocol, or transmitting the multiple communications before transmitting an indication of an additional modification or an indication to cancel the modification.

In a thirteenth aspect, alone or in combination with one or more of the first through twelfth aspects, transmitting the dynamic indication of the modification is based at least in part on one or more of traffic characteristics of the one or more communications, jitter of the one or more communications, a number of packets per burst associated with the one or more communications, or sizes of the packets associated with the one or more communications.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
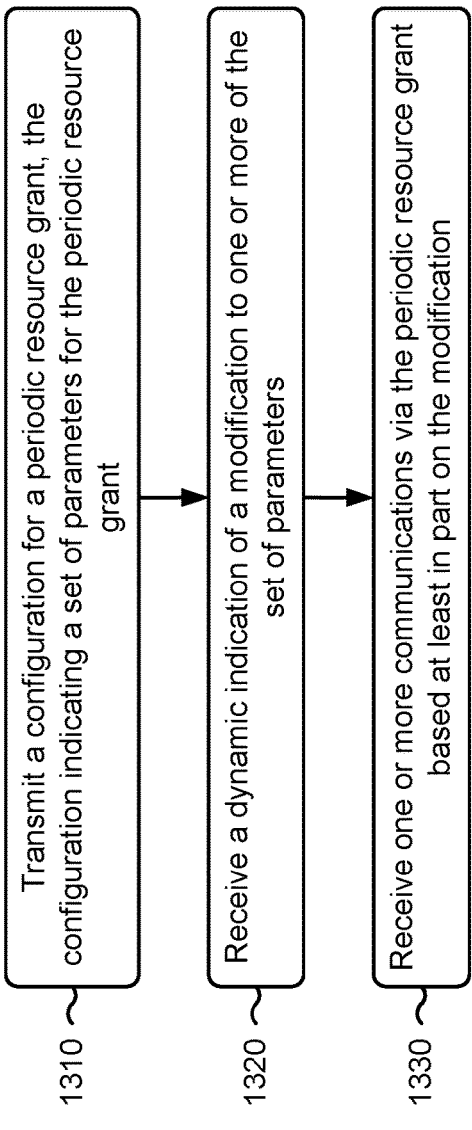

FIG. 13 is a diagram illustrating an example process 1300 performed, for example, by a network node, in accordance with the present disclosure. Example process 1300 is an example where the network node (e.g., a base station 110, a CU, a DU, and/or an RU) performs operations associated with dynamic indications of modifications to a periodic resource grant.

As shown in FIG. 13, in some aspects, process 1300 may include transmitting a configuration for a periodic resource grant, the configuration indicating a set of parameters for the periodic resource grant (block 1310). For example, the network node (e.g., using communication manager 150 and/or transmission component 1504, depicted in FIG. 15) may transmit a configuration for a periodic resource grant, the configuration indicating a set of parameters for the periodic resource grant, as described above.

As further shown in FIG. 13, in some aspects, process 1300 may include receiving a dynamic indication of a modification to one or more of the set of parameters (block 1320). For example, the network node (e.g., using communication manager 150 and/or reception component 1502, depicted in FIG. 15) may receive a dynamic indication of a modification to one or more of the set of parameters, as described above.

As further shown in FIG. 13, in some aspects, process 1300 may include receiving one or more communications via the periodic resource grant based at least in part on the modification (block 1330). For example, the network node (e.g., using communication manager 150 and/or reception component 1502, depicted in FIG. 15) may receive one or more communications via the periodic resource grant based at least in part on the modification, as described above.

Process 1300 may include additional aspects, such as any single aspect or any combination of aspects described below and/or in connection with one or more other processes described elsewhere herein.

In a first aspect, receiving the dynamic indication of the modification comprises receiving the dynamic indication via one or more of reference signals (e.g., DMRSs), an RMI, one or more MAC CEs, or an indication sent with an SR.

In a second aspect, alone or in combination with the first aspect, receiving the dynamic indication of the modification comprises receiving the dynamic indication via an indication multiplexed with an uplink communication scheduled via the periodic resource grant, or an indication multiplexed with a MAC CE associated with the uplink communication scheduled via the periodic resource grant.

In a third aspect, alone or in combination with one or more of the first and second aspects, the modification comprises one or more of cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

In a fourth aspect, alone or in combination with one or more of the first through third aspects, the change of parameters of the one or more communications comprises a change to an MCS, a change to a number of resource blocks, a change to a number of symbols, or a change to a reference signal pattern.

In a fifth aspect, alone or in combination with one or more of the first through fourth aspects, process 1300 includes transmitting an indication of one or more additional scheduling request resources based at least in part on the modification comprising cancelation of the one or more occasions of the periodic resource grant.

In a sixth aspect, alone or in combination with one or more of the first through fifth aspects, process 1300 includes transmitting an indication of an acknowledgment of the dynamic indication.

In a seventh aspect, alone or in combination with one or more of the first through sixth aspects, process 1300 includes transmitting an indication of a configuration for receiving the indication of the acknowledgment.

In an eighth aspect, alone or in combination with one or more of the first through seventh aspects, receiving the dynamic indication of the modification comprises receiving one or more repetitions of the dynamic indication of the modification.

In a ninth aspect, alone or in combination with one or more of the first through eighth aspects, process 1300 includes receiving, after receiving the dynamic indication of the modification, an indication to cancel the modification.

In a tenth aspect, alone or in combination with one or more of the first through ninth aspects, the dynamic indication of the modification applies to one or more of a downlink periodic resource grant, multiple downlink periodic resource grants, an uplink periodic resource grant, or multiple uplink periodic resource grants.

In an eleventh aspect, alone or in combination with one or more of the first through tenth aspects, receiving the one or more communications via the periodic resource grant based at least in part on the modification comprises receiving the one or more communications having the modification applied after a modification time period.

In a twelfth aspect, alone or in combination with one or more of the first through eleventh aspects, the modification time period is based at least in part on one or more of a configuration indicated from a network node, a capability of a UE that receives the one or more communications, or a configuration indicated in a communication protocol.

In a thirteenth aspect, alone or in combination with one or more of the first through twelfth aspects, process 1300 includes applying the modification to multiple communications of the one or more communications based at least in part on an indicated number of communications, a configured number of communications, a configuration within a communication protocol, or receiving the multiple communications before receiving an indication of an additional modification or an indication to cancel the modification.

In a fourteenth aspect, alone or in combination with one or more of the first through thirteenth aspects, receiving the dynamic indication of the modification is based at least in part on one or more of a buffer status associated for data packets of an application associated with the one or more communications, a number of packets per burst associated with the one or more communications, or sizes of the packets associated with the one or more communications.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408 (e.g., communication manager 140).

In some aspects, the apparatus 1400 may be configured to perform one or more operations described herein in connection with FIGS. 7-9. Additionally, or alternatively, the apparatus 1400 may be configured to perform one or more processes described herein, such as process 1000 of FIG. 10, process 1100 of FIG. 11, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive a configuration for a periodic resource grant, the configuration indicating a set of parameters for the periodic resource grant. The reception component 1402 may receive a dynamic indication of a modification to one or more of the set of parameters. The reception component 1402 may receive one or more communications via the periodic resource grant based at least in part on the modification.

The communication manager 1408 may perform additional control channel monitoring based at least in part on the modification comprising cancelation of the one or more occasions of the periodic resource grant.

The transmission component 1404 may transmit an indication of an acknowledgment of the dynamic indication of the modification.

The reception component 1402 may receive an indication of a configuration for transmitting the indication of the acknowledgment.

The reception component 1402 may receive, after receiving the dynamic indication of the modification, an indication to cancel the modification.

The communication manager 1408 may apply the modification to multiple communications of the one or more communications based at least in part on an indicated number of communications, a configured number of communications, a configuration within a communication protocol, or receiving the multiple communications before receiving an indication of an additional modification or an indication to cancel the modification.

The reception component 1402 may receive a configuration for a periodic resource grant, the configuration indicating a set of parameters for the periodic resource grant. The transmission component 1404 may transmit a dynamic indication of a modification to one or more of the set of parameters. The transmission component 1404 may transmit one or more communications via the periodic resource grant based at least in part on the modification.

The reception component 1402 may receive an indication of one or more additional scheduling request resources based at least in part on the modification comprising cancelation of the one or more occasions of the periodic resource grant.

The reception component 1402 may receive an indication of an acknowledgment of the dynamic indication.

The reception component 1402 may receive an indication of a configuration for receiving the indication of the acknowledgment.

The transmission component 1404 may transmit, after transmitting the dynamic indication of the modification, an indication to cancel the modification.

The communication manager 1408 may apply the modification to multiple communications of the one or more communications based at least in part on an indicated number of communications, a configured number of communications, a configuration within a communication protocol, or transmitting the multiple communications before transmitting an indication of an additional modification or an indication to cancel the modification.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

FIG. 15 is a diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a communication manager 1508 (e.g., the communication manager 150).

In some aspects, the apparatus 1500 may be configured to perform one or more operations described herein in connection with FIGS. 7-9. Additionally, or alternatively, the apparatus 1500 may be configured to perform one or more processes described herein, such as process 1200 of FIG. 12, process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The transmission component 1504 may transmit a configuration for a periodic resource grant, the configuration indicating a set of parameters for the periodic resource grant. The transmission component 1504 may transmit a dynamic indication of a modification to one or more of the set of parameters. The transmission component 1504 may transmit one or more communications via the periodic resource grant based at least in part on the modification.

The transmission component 1504 may transmit an indication to perform additional control channel monitoring based at least in part on the modification comprising cancelation of the one or more occasions of the periodic resource grant.

The reception component 1502 may receive an indication of an acknowledgment of the dynamic indication of the modification.

The transmission component 1504 may transmit an indication of a configuration for transmitting the indication of the acknowledgment.

The transmission component 1504 may transmit, after transmitting the dynamic indication of the modification, an indication to cancel the modification.

The communication manager 1508 may apply the modification to multiple communications of the one or more communications based at least in part on an indicated number of communications, a configured number of communications, a configuration within a communication protocol, or transmitting the multiple communications before transmitting an indication of an additional modification or an indication to cancel the modification.

The transmission component 1504 may transmit a configuration for a periodic resource grant, the configuration indicating a set of parameters for the periodic resource grant. The reception component 1502 may receive a dynamic indication of a modification to one or more of the set of parameters. The reception component 1502 may receive one or more communications via the periodic resource grant based at least in part on the modification.

The transmission component 1504 may transmit an indication of one or more additional scheduling request resources based at least in part on the modification comprising cancelation of the one or more occasions of the periodic resource grant.

The transmission component 1504 may transmit an indication of an acknowledgment of the dynamic indication.

The transmission component 1504 may transmit an indication of a configuration for receiving the indication of the acknowledgment.

The reception component 1502 may receive, after receiving the dynamic indication of the modification, an indication to cancel the modification.

The communication manager 1508 may apply the modification to multiple communications of the one or more communications based at least in part on an indicated number of communications, a configured number of communications, a configuration within a communication protocol, or receiving the multiple communications before receiving an indication of an additional modification or an indication to cancel the modification.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a configuration for a periodic resource grant, the configuration indicating a set of parameters for the periodic resource grant; receiving a dynamic indication of a modification to one or more of the set of parameters; and receiving one or more communications via the periodic resource grant based at least in part on the modification.

Aspect 2: The method of Aspect 1, wherein receiving the dynamic indication of the modification comprises receiving the dynamic indication via one or more of: a wake up signal (WUS), demodulation reference signals (DMRSs), downlink control information (DCI), one or more medium access control (MAC) control elements (CEs), or an indication sent with a dynamic grant, a semi-persistent-scheduling (SPS) message, or a configured grant (CG).

Aspect 3: The method of any of Aspects 1-2, wherein the modification comprises one or more of: cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

Aspect 4: The method of Aspect 3, wherein the change of parameters of the one or more communications comprises: a change to a modulation and coding scheme (MCS), a change to a number of resource blocks, a change to a number of symbols, or a change to a reference signal pattern.

Aspect 5: The method of any of Aspects 3-4, further comprising: performing additional control channel monitoring based at least in part on the modification comprising cancelation of the one or more occasions of the periodic resource grant.

Aspect 6: The method of any of Aspects 1-5, further comprising: transmitting an indication of an acknowledgment of the dynamic indication of the modification.

Aspect 7: The method of Aspect 6, further comprising: receiving an indication of a configuration for transmitting the indication of the acknowledgment.

Aspect 8: The method of any of Aspects 1-7, wherein receiving the dynamic indication of the modification comprises: receiving one or more repetitions of the dynamic indication of the modification.

Aspect 9: The method of any of Aspects 1-8, further comprising: receiving, after receiving the dynamic indication of the modification, an indication to cancel the modification.

Aspect 10: The method of any of Aspects 1-9, wherein the dynamic indication of the modification applies to one or more of: a downlink periodic resource grant, multiple downlink periodic resource grants, an uplink periodic resource grant, or multiple uplink periodic resource grants.

Aspect 11: The method of any of Aspects 1-10, wherein receiving the one or more communications via the periodic resource grant based at least in part on the modification comprises: receiving the one or more communications having the modification applied after a modification time period.

Aspect 12: The method of Aspect 11, wherein the modification time period is based at least in part on one or more of: a configuration indicated from a network node, a capability of the UE, or a configuration indicated in a communication protocol.

Aspect 13: The method of any of Aspects 1-12, further comprising applying the modification to multiple communications of the one or more communications based at least in part on: an indicated number of communications, a configured number of communications, a configuration within a communication protocol, or receiving the multiple communications before receiving an indication of an additional modification or an indication to cancel the modification.

Aspect 14: The method of any of Aspects 1-13, wherein receiving the dynamic indication of the modification is based at least in part on one or more of: traffic characteristics of the one or more communications, jitter of the one or more communications, a number of packets per burst associated with the one or more communications, or sizes of the packets associated with the one or more communications.

Aspect 15: A method of wireless communication performed by a user equipment (UE), comprising: receiving a configuration for a periodic resource grant, the configuration indicating a set of parameters for the periodic resource grant; transmitting a dynamic indication of a modification to one or more of the set of parameters; and transmitting one or more communications via the periodic resource grant based at least in part on the modification.

Aspect 16: The method of Aspect 15, wherein transmitting the dynamic indication of the modification comprises transmitting the dynamic indication via one or more of: demodulation reference signals (DMRSs), a resource modification indication (RMI), one or more medium access control (MAC) control elements (CEs), or an indication sent with a scheduling request (SR).

Aspect 17: The method of any of Aspects 15-16, wherein transmitting the dynamic indication of the modification comprises transmitting the dynamic indication via: an indication multiplexed with an uplink communication scheduled via the periodic resource grant, or an indication multiplexed with a medium access control (MAC) control element (CE) associated with the uplink communication scheduled via the periodic resource grant.

Aspect 18: The method of any of Aspects 15-17, wherein the modification comprises one or more of: cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

Aspect 19: The method of Aspect 18, wherein the change of parameters of the one or more communications comprises: a change to a modulation and coding scheme (MCS), a change to a number of resource blocks, a change to a number of symbols, or a change to a reference signal pattern.

Aspect 20: The method of any of Aspects 18-19, further comprising: receiving an indication of one or more additional scheduling request resources based at least in part on the modification comprising cancelation of the one or more occasions of the periodic resource grant.

Aspect 21: The method of any of Aspects 15-20, further comprising: receiving an indication of an acknowledgment of the dynamic indication.

Aspect 22: The method of Aspect 21, further comprising: receiving an indication of a configuration for receiving the indication of the acknowledgment.

Aspect 23: The method of any of Aspects 15-22, wherein transmitting the dynamic indication of the modification comprises: transmitting one or more repetitions of the dynamic indication of the modification.

Aspect 24: The method of any of Aspects 15-23, further comprising: transmitting, after transmitting the dynamic indication of the modification, an indication to cancel the modification.

Aspect 25: The method of any of Aspects 15-24, wherein the dynamic indication of the modification applies to one or more of: a downlink periodic resource grant, multiple downlink periodic resource grants, an uplink periodic resource grant, or multiple uplink periodic resource grants.

Aspect 26: The method of any of Aspects 15-25, wherein transmitting the one or more communications via the periodic resource grant based at least in part on the modification comprises: transmitting the one or more communications having the modification applied after a modification time period.

Aspect 27: The method of Aspect 26, wherein the modification time period is based at least in part on one or more of: a configuration indicated from a network node, a capability of the UE, or a configuration indicated in a communication protocol.

Aspect 28: The method of any of Aspects 15-27, further comprising applying the modification to multiple communications of the one or more communications based at least in part on: an indicated number of communications, a configured number of communications, a configuration within a communication protocol, or transmitting the multiple communications before transmitting an indication of an additional modification or an indication to cancel the modification.

Aspect 29: The method of any of Aspects 15-28, wherein transmitting the dynamic indication of the modification is based at least in part on one or more of: a buffer status associated for data packets of an application associated with the one or more communications, a number of packets per burst associated with the one or more communications, or sizes of the packets associated with the one or more communications.

Aspect 30: A method of wireless communication performed by a network node, comprising: transmitting a configuration for a periodic resource grant, the configuration indicating a set of parameters for the periodic resource grant; transmitting a dynamic indication of a modification to one or more of the set of parameters; and transmitting one or more communications via the periodic resource grant based at least in part on the modification.

Aspect 31: The method of Aspect 30, wherein transmitting the dynamic indication of the modification comprises transmitting the dynamic indication via one or more of: a wake up signal (WUS), demodulation reference signals (DMRSs), downlink control information (DCI), one or more medium access control (MAC) control elements (CEs), or an indication sent with a dynamic grant, a semi-persistent-scheduling (SPS) message, or a configured grant (CG).

Aspect 32: The method of any of Aspects 30-31, wherein the modification comprises one or more of: cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

Aspect 33: The method of Aspect 32, wherein the change of parameters of the one or more communications comprises: a change to a modulation and coding scheme (MCS), a change to a number of resource blocks, a change to a number of symbols, or a change to a reference signal pattern.

Aspect 34: The method of any of Aspects 32-33, further comprising: transmitting an indication to perform additional control channel monitoring based at least in part on the modification comprising cancelation of the one or more occasions of the periodic resource grant.

Aspect 35: The method of any of Aspects 30-34, further comprising: receiving an indication of an acknowledgment of the dynamic indication of the modification.

Aspect 36: The method of Aspect 35, further comprising: transmitting an indication of a configuration for transmitting the indication of the acknowledgment.

Aspect 37: The method of any of Aspects 30-36, wherein transmitting the dynamic indication of the modification comprises: transmitting one or more repetitions of the dynamic indication of the modification.

Aspect 38: The method of any of Aspects 30-37, further comprising: transmitting, after transmitting the dynamic indication of the modification, an indication to cancel the modification.

Aspect 39: The method of any of Aspects 30-38, wherein the dynamic indication of the modification applies to one or more of: a downlink periodic resource grant, multiple downlink periodic resource grants, an uplink periodic resource grant, or multiple uplink periodic resource grants.

Aspect 40: The method of any of Aspects 30-39, wherein transmitting the one or more communications via the periodic resource grant based at least in part on the modification comprises: transmitting the one or more communications having the modification applied after a modification time period.

Aspect 41: The method of Aspect 40, wherein the modification time period is based at least in part on one or more of: a configuration indicated to a user equipment (UE), a capability of the UE, or a configuration indicated in a communication protocol.

Aspect 42: The method of any of Aspects 30-41, further comprising applying the modification to multiple communications of the one or more communications based at least in part on: an indicated number of communications, a configured number of communications, a configuration within a communication protocol, or transmitting the multiple communications before transmitting an indication of an additional modification or an indication to cancel the modification.

Aspect 43: The method of any of Aspects 30-42, wherein transmitting the dynamic indication of the modification is based at least in part on one or more of: traffic characteristics of the one or more communications, jitter of the one or more communications, a number of packets per burst associated with the one or more communications, or sizes of the packets associated with the one or more communications.

Aspect 44: A method of wireless communication performed by a network node, comprising: transmitting a configuration for a periodic resource grant, the configuration indicating a set of parameters for the periodic resource grant; receiving a dynamic indication of a modification to one or more of the set of parameters; and receiving one or more communications via the periodic resource grant based at least in part on the modification.

Aspect 45: The method of Aspect 44, wherein receiving the dynamic indication of the modification comprises receiving the dynamic indication via one or more of: demodulation reference signals (DMRSs), a resource modification indication (RMI), one or more medium access control (MAC) control elements (CEs), or an indication sent with a scheduling request (SR).

Aspect 46: The method of any of Aspects 44-45, wherein receiving the dynamic indication of the modification comprises receiving the dynamic indication via: an indication multiplexed with an uplink communication scheduled via the periodic resource grant, or an indication multiplexed with a medium access control (MAC) control element (CE) associated with the uplink communication scheduled via the periodic resource grant.

Aspect 47: The method of any of Aspects 44-46, wherein the modification comprises one or more of: cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

Aspect 48: The method of Aspect 47, wherein the change of parameters of the one or more communications comprises: a change to a modulation and coding scheme (MCS), a change to a number of resource blocks, a change to a number of symbols, or a change to a reference signal pattern.

Aspect 49: The method of any of Aspects 47-48, further comprising: transmitting an indication of one or more additional scheduling request resources based at least in part on the modification comprising cancelation of the one or more occasions of the periodic resource grant.

Aspect 50: The method of any of Aspects 44-49, further comprising: transmitting an indication of an acknowledgment of the dynamic indication.

Aspect 51: The method of Aspect 50, further comprising: transmitting an indication of a configuration for receiving the indication of the acknowledgment.

Aspect 52: The method of any of Aspects 44-51 wherein receiving the dynamic indication of the modification comprises: receiving one or more repetitions of the dynamic indication of the modification.

Aspect 53: The method of any of Aspects 44-52, further comprising: receiving, after receiving the dynamic indication of the modification, an indication to cancel the modification.

Aspect 54: The method of any of Aspects 44-53, wherein the dynamic indication of the modification applies to one or more of: a downlink periodic resource grant, multiple downlink periodic resource grants, an uplink periodic resource grant, or multiple uplink periodic resource grants.

Aspect 55: The method of any of Aspects 44-54, wherein receiving the one or more communications via the periodic resource grant based at least in part on the modification comprises: receiving the one or more communications having the modification applied after a modification time period.

Aspect 56: The method of Aspect 55, wherein the modification time period is based at least in part on one or more of: a configuration indicated from a network node, a capability of a user equipment (UE) that receives the one or more communications, or a configuration indicated in a communication protocol.

Aspect 57: The method of any of Aspects 44-56, further comprising applying the modification to multiple communications of the one or more communications based at least in part on: an indicated number of communications, a configured number of communications, a configuration within a communication protocol, or receiving the multiple communications before receiving an indication of an additional modification or an indication to cancel the modification.

Aspect 58: The method of any of Aspects 44-57, wherein receiving the dynamic indication of the modification is based at least in part on one or more of: a buffer status associated for data packets of an application associated with the one or more communications, a number of packets per burst associated with the one or more communications, or sizes of the packets associated with the one or more communications.

Aspect 59: An apparatus for wireless communication at a device, comprising a processor; memory coupled with the processor; and instructions stored in the memory and executable by the processor to cause the apparatus to perform the method of one or more of Aspects 1-58.

Aspect 60: A device for wireless communication, comprising a memory and one or more processors coupled to the memory, the one or more processors configured to perform the method of one or more of Aspects 1-58.

Aspect 61: An apparatus for wireless communication, comprising at least one means for performing the method of one or more of Aspects 1-58.

Aspect 62: A non-transitory computer-readable medium storing code for wireless communication, the code comprising instructions executable by a processor to perform the method of one or more of Aspects 1-58.

Aspect 63: A non-transitory computer-readable medium storing a set of instructions for wireless communication, the set of instructions comprising one or more instructions that, when executed by one or more processors of a device, cause the device to perform the method of one or more of Aspects 1-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a configuration for a periodic resource grant, the configuration indicating a set of parameters for the periodic resource grant;
transmit a dynamic indication of a modification to one or more of the set of parameters;
receive, in response to the transmission of the dynamic indication by the UE, an acknowledgement of the dynamic indication; and
transmit one or more communications via the periodic resource grant based at least in part on the modification.

2. The UE of claim 1, wherein the one or more processors, to transmit the dynamic indication of the modification, are configured to transmit the dynamic indication via one or more of:
demodulation reference signals (DMRSs),
a resource modification indication (RMI),
one or more medium access control (MAC) control elements (CEs), or
an indication sent with a scheduling request (SR).

3. The UE of claim 1, wherein the one or more processors, to transmit the dynamic indication of the modification, are configured to transmit the dynamic indication via:
an indication multiplexed with an uplink communication scheduled via the periodic resource grant, or an indication multiplexed with a medium access control (MAC) control element (CE) associated with the uplink communication scheduled via the periodic resource grant.

4. The UE of claim 1, wherein the modification comprises one or more of:
cancelation of one or more occasions of the periodic resource grant,
a shift in time of the one or more occasions,
a shift in frequency of the one or more occasions,
a change of parameters of one or more communications of the one or more occasions,
addition of one or more additional occasions,
a change in a beam for the one or more occasions, or
a utilization pattern for the one or more occasions.

5. The UE of claim 4, wherein the change of parameters of the one or more communications comprises:
a change to a modulation and coding scheme (MCS),
a change to a number of resource blocks,
a change to a number of symbols, or
a change to a reference signal pattern.

6. The UE of claim 4, wherein the one or more processors are further configured to:
receive an indication of one or more additional scheduling request resources based at least in part on the modification comprising cancelation of the one or more occasions.

7. The UE of claim 1, wherein
the acknowledgment of the dynamic indication is based at least in part on a type of the modification.

8. The UE of claim 7, wherein the one or more processors are further configured to:
receive an indication of a configuration for receiving the indication of the acknowledgment.

9. The UE of claim 1, wherein the one or more processors, to transmit the dynamic indication of the modification, are configured to:
transmit one or more repetitions of the dynamic indication of the modification.

10. The UE of claim 1, wherein the one or more processors are further configured to:
transmit, after transmitting the dynamic indication of the modification, an indication to cancel the modification.

11. The UE of claim 1, wherein the dynamic indication of the modification applies to one or more of:
a downlink periodic resource grant,
multiple downlink periodic resource grants,
an uplink periodic resource grant, or
multiple uplink periodic resource grants.

12. The UE of claim 1, wherein the one or more processors, to transmit the one or more communications via the periodic resource grant based at least in part on the modification, are configured to:
transmit the one or more communications having the modification applied after a modification time period.

13. The UE of claim 12, wherein the modification time period is based at least in part on one or more of:
a configuration indicated from a network node,
a capability of the UE, or
a configuration indicated in a communication protocol.

14. The UE of claim 1, wherein the one or more processors are further configured to apply the modification to multiple communications of the one or more communications based at least in part on:
an indicated number of communications,
a configured number of communications,
a configuration within a communication protocol, or transmitting the multiple communications before transmitting an indication of an additional modification or an indication to cancel the modification.

15. The UE of claim 1, wherein transmitting the dynamic indication of the modification is based at least in part on one or more of:

a buffer status associated for data packets of an application associated with the one or more communications, a number of packets per burst associated with the one or more communications, or sizes of the packets associated with the one or more communications.

16. A network node for wireless communication, comprising:

one or more memories; and one or more processors, coupled to the one or more memories, configured to:

transmit a configuration for a periodic resource grant, the configuration indicating a set of parameters for the periodic resource grant;

receive a dynamic indication of a modification to one or more of the set of parameters;

transmit, in response to the reception of the dynamic indication by the network node, an acknowledgement of the dynamic indication; and receive one or more communications via the periodic resource grant based at least in part on the modification.

17. The network node of claim 16, wherein the one or more processors, to receive the dynamic indication of the modification, are configured to receive the dynamic indication via one or more of:

demodulation reference signals (DMRSs), a resource modification indication (RMI), one or more medium access control (MAC) control elements (CEs), or an indication sent with a scheduling request (SR).

18. The network node of claim 16, wherein the one or more processors, to receive the dynamic indication of the modification, are configured to receive the dynamic indication via:

an indication multiplexed with an uplink communication scheduled via the periodic resource grant, or an indication multiplexed with a medium access control (MAC) control element (CE) associated with the uplink communication scheduled via the periodic resource grant.

19. The network node of claim 16, wherein the modification comprises one or more of:

cancelation of one or more occasions of the periodic resource grant, a shift in time of the one or more occasions, a shift in frequency of the one or more occasions, a change of parameters of one or more communications of the one or more occasions, addition of one or more additional occasions, a change in a beam for the one or more occasions, or a utilization pattern for the one or more occasions.

20. The network node of claim 19, wherein the one or more processors are further configured to:

transmit an indication of one or more additional scheduling request resources based at least in part on the modification comprising cancelation of the one or more occasions.

21. The network node of claim 16, wherein the acknowledgment of the dynamic indication is based at least in part on a type of the modification.

22. The network node of claim 16, wherein the one or more processors, to receive the dynamic indication of the modification, are configured to:

receive one or more repetitions of the dynamic indication of the modification.

23. The network node of claim 16, wherein the one or more processors are further configured to:

receive, after receiving the dynamic indication of the modification, an indication to cancel the modification.

24. The network node of claim 16, wherein the dynamic indication of the modification applies to one or more of:

a downlink periodic resource grant, multiple downlink periodic resource grants, an uplink periodic resource grant, or multiple uplink periodic resource grants.

25. The network node of claim 16, wherein the one or more processors, to receive the one or more communications via the periodic resource grant based at least in part on the modification, are configured to:

receive the one or more communications having the modification applied after a modification time period.

26. The network node of claim 25, wherein the modification time period is based at least in part on one or more of:

a configuration indicated from another network node, a capability of a user equipment (UE) that receives the one or more communications, or a configuration indicated in a communication protocol.

27. The network node of claim 16, wherein the one or more processors are further configured to apply the modification to multiple communications of the one or more communications based at least in part on:

an indicated number of communications, a configured number of communications, a configuration within a communication protocol, or receiving the multiple communications before receiving an indication of an additional modification or an indication to cancel the modification.

28. The network node of claim 16, wherein receiving the dynamic indication of the modification is based at least in part on one or more of:

a buffer status associated for data packets of an application associated with the one or more communications, a number of packets per burst associated with the one or more communications, or sizes of the packets associated with the one or more communications.

29. A method of wireless communication performed by a user equipment (UE), comprising:

receiving a configuration for a periodic resource grant, the configuration indicating a set of parameters for the periodic resource grant;

transmitting a dynamic indication of a modification to one or more of the set of parameters;

receiving, in response to the transmission of the dynamic indication by the UE, an acknowledgement of the dynamic indication; and transmitting one or more communications via the periodic resource grant based at least in part on the modification.

30. A method of wireless communication performed by a network node, comprising:

transmitting a configuration for a periodic resource grant, the configuration indicating a set of parameters for the periodic resource grant;

receiving a dynamic indication of a modification to one or more of the set of parameters;

transmitting, in response to the reception of the dynamic indication by the network node, an acknowledgement of the dynamic indication; and receiving one or more communications via the periodic resource grant based at least in part on the modification.

* * * * *